US012618507B2

(12) United States Patent
Buchi et al.

(10) Patent No.: US 12,618,507 B2
(45) Date of Patent: May 5, 2026

(54) GIMBAL STABILISATION SYSTEM

(71) Applicant: Quadsat APS, Odense N (DK)

(72) Inventors: Andrian Buchi, Otterup (DK); Joakim Espeland, Otterup (DK); Rasmus Kumar Udesen Gupta, Nyborg (DK)

(73) Assignee: Quadsat APS, Odense N (DK)

( * ) Notice: Subject to any disclaimer, the term of this patent is extended or adjusted under 35 U.S.C. 154(b) by 282 days.

(21) Appl. No.: 18/021,378

(22) PCT Filed: Aug. 12, 2021

(86) PCT No.: PCT/EP2021/072560
§ 371 (c)(1),
(2) Date: Feb. 14, 2023

(87) PCT Pub. No.: WO2022/034200
PCT Pub. Date: Feb. 17, 2022

(65) Prior Publication Data
US 2023/0313938 A1 Oct. 5, 2023

(30) Foreign Application Priority Data

Aug. 14, 2020 (GB) ...................................... 2012756

(51) Int. Cl.
*F16M 11/12* (2006.01)
*B64D 47/00* (2006.01)
(Continued)

(52) U.S. Cl.
CPC ......... *F16M 11/123* (2013.01); *G05D 1/0094* (2013.01); *H01Q 1/185* (2013.01); *H01Q 3/005* (2013.01); *B64D 47/00* (2013.01)

(58) Field of Classification Search
None
See application file for complete search history.

(56) References Cited

U.S. PATENT DOCUMENTS

2017/0198747 A1* 7/2017 Chen .................. F16M 11/2064

FOREIGN PATENT DOCUMENTS

| CN | 106953553 A | 7/2017 |
| CN | 108137151 A | 6/2018 |

(Continued)

OTHER PUBLICATIONS

Duthoit, Simon et al., "UAV-Based in Situ Antenna Characterization: Analysis and Design Requirements a Thesis Approved for the School of Electrical and Computer Engineering", May 11, 2018, 157 pages.

(Continued)

*Primary Examiner* — Abdhesh K Jha
(74) *Attorney, Agent, or Firm* — ArentFox Schiff LLP

(57) ABSTRACT

Methods, apparatus, and systems are provided for controlling a payload of a gimbal stabilisation system for an aircraft during testing an antenna under test (AUT). The gimbal stabilisation system including a payload control assembly coupled via a yaw motor to a gimbal assembly. The gimbal assembling including the payload comprising a first section with a transceiver for use in testing the AUT and a second section rotatably coupled to the gimbal assembly. The payload control assembly including a controller configured to operate the yaw motor and gimbal assembly by: receiving an in-flight position of the aircraft during testing of the AUT; receiving a position of the AUT in relation to the aircraft; and controlling the gimbal assembly by: calculating a pointing direction and alignment of the first section of the payload relative to the AUT based on the received position of the aircraft and the received position of the AUT; and maintaining pointing and alignment of the first section of the payload towards the AUT based on the calculated pointing direction and alignment of the first section of the payload.

22 Claims, 13 Drawing Sheets

120

Receive in-flight positioning data — 122

Receive AUT positioning data — 124

Calculate pointing direction and alignment of payload to AUT — 126

Adjust/Maintain pointing and alignment of payload with AUT based on pointing and direction calculation — 128

(51) Int. Cl.
*G05D 1/00* (2024.01)
*H01Q 1/18* (2006.01)
*H01Q 3/00* (2006.01)

(56) References Cited

FOREIGN PATENT DOCUMENTS

| | | | |
|----|--------------|-----|---------|
| CN | 108700249 A  | 10/2018 |
| CN | 110927467 A  | 3/2020 |
| CN | 111537965 A  | 8/2020 |
| EP | 4196858 A1   | 6/2023 |
| RU | 2704393 C1   | 10/2019 |
| WO | 2021/175343 A2 | 9/2021 |
| WO | 2022/034200 A1 | 2/2022 |

OTHER PUBLICATIONS

Intention to Grant received for European Application No. 21765599. 2, mailed on May 2, 2024, 11 pages.

Office Action received for GB Patent Application No. 2302104.1, mailed on Apr. 9, 2024, 4 pages.

Office Action and search report received for GB Patent Application No. 2012756.9, mailed on Apr. 11, 2022, 7 pages.

Locke et al., "High-performance Two-axis Gimbal System for Free Space Laser Communications Onboard Unmanned Aircraft Systems", Free-Space Laser Communication Technologies XXIII, vol. 7923, 2011, 8 pages.

Office Action received for Singapore Patent Application No. 11202301093X, mailed on Nov. 27, 2025, 4 pages.

Office Action received for Chinese Patent Application No. 202180070690.6, mailed on Dec. 25, 2025, 30 pages (18 pages of English Translation and 12 pages of Original Document).

* cited by examiner

*120*

Receive in-flight positioning data ~*122*

Receive AUT positioning data ~*124*

Calculate pointing direction and alignment of payload to AUT ~*126*

Adjust/Maintain pointing and alignment of payload with AUT based on pointing and direction calculation ~*128*

*600*

*604*

*608*

*602*

μP(s)

CI

*606*

OS

DS

*606a*

*606b*

*610*

*612*

Positioning
UAV/AUT

*614*

Gimbal/payload
control

*616*

Test control
AUT

*618*

GIMBAL STABILISATION SYSTEM

CROSS-REFERENCE TO RELATED APPLICATION

This is a U.S. National Stage Application, filed under 35 U.S.C. § 371, of International Patent Application Number PCT/EP2021/072560, filed on Aug. 12, 2021, which claims priority to GB Patent Application No. 2012756.9 filed on Aug. 14, 2020, the disclosures of which are incorporated herein by reference in their entireties.

The present application relates to a system, apparatus and method for a gimbal stabilisation system of an aircraft such as an unmanned aerial vehicle (UAV) for use in testing an antenna under test (AUT) and applications thereto.

BACKGROUND

There are solutions for antenna measurements in which the transmitting and/or receiving probe antenna is mounted on an aircraft such as, without limitation, for example an unmanned aerial vehicle (UAV). These systems usually use a fixed mounted probe antenna system and can be used for measurement of broadcast and telecommunication environments. As directional probe antennas on UAVs are usually used for the measurements, the gain will change depending on where the probe antenna is pointed. Although existing technology uses directional probe antennas which are fixed mounted to the structure of the UAV, which when the UAV is moving will not be able to point at the antenna under test and thus the relative gain of the probe antenna will change depending on the UAV roll, pitch and yaw movements. This is a problem when performing relative measurements of the AUT, where it is required to have a constant gain of the probe which is being used to take the measurement as it moves around the AUT. Alternatively, the flight of the UAV needs to be pre-programmed and/or manually adjusted such that the fixed probe antenna is directed towards the AUT. This is difficult to manually maintain during flight of a UAV for accurate measurements by the fixed probe antenna.

Furthermore, for linear polarization RF transmission, it is important that the AUT and the probe antenna on the UAV that is being used for the measurements are aligned. This will allow for co-polar and cross-polar measurements of the AUT. However, the UAV will have movement in its attitude such as, for example, pitch, roll and yaw as it flies. These movements and also the flight path may cause misalignment of the probe antenna if the probe antenna is fixed with the structure of the UAV. Again, such alignment is difficult to manually maintain during flight of the UAV for accurate measurements by the fixed probe antenna.

There is a desire for a more improved aircraft/UAV antenna probe system that overcomes at least one or more of these disadvantages.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) for controlling a gimbal structure to ensure a payload coupled to the gimbal structure, when mounted on an aircraft, such as, without limitation, for example, an unmanned aerial vehicle is pointed and/or aligned with an antenna under test (AUT). The payload may be configured and operable to be used during an antenna performance procedure (APE) for testing and/or measuring the performance of the AUT. The pointing and/or alignment of the payload is calculated and adjusted based on received position information such as, without limitation, for example the position/location(s), attitude, heading, and/or speed of the aircraft/gimbal structure and also received position information such as, without limitation for example the position/location(s) of the AUT. From this, adjustments to the gimbal structure are made to adjust/maintain/control the pointing and/or alignment of the payload in the direction of the AUT. For example, for adjusting/controlling and/or maintaining pointing and alignment of a first section of the payload towards the AUT at least during the APE whilst the aircraft is in-flight. Adjusting the payload in this manner ensures an accurate APE test can be performed with the AUT.

In a first aspect, the present disclosure provides a computer-implemented method of controlling a gimbal stabilisation system of an aircraft in an antenna test system for testing an antenna under test (AUT), the gimbal stabilisation system comprising a control assembly rotatably coupled to a gimbal assembly comprising a payload, the payload comprising a first section including a communication sensor interface for use in testing the AUT and a second section rotatably coupled to the gimbal assembly, the control assembly comprising a controller, the method, performed by the controller, further comprising: receiving an in-flight position of the aircraft during testing of the AUT; receiving a position of the AUT in relation to the aircraft; and controlling the gimbal assembly by: calculating a pointing direction and alignment of the first section of the payload relative to the AUT based on the received position of the aircraft and the received position of the AUT; and maintaining pointing and alignment of the first section of the payload towards the AUT based on the calculated pointing direction and alignment of the first section of the payload.

As an option, the computer-implemented method wherein receiving the in-flight position of the aircraft further comprising receiving data representative of global positioning system, GPS, position, heading, altitude and/or attitude of the aircraft. As another option, the computer-implemented method further comprising receiving the position of the AUT further comprising receiving data representative of information associated with the position of the AUT. As a further option, the computer-implemented method, wherein the communication sensor interface further comprises at least one from the group of: a receiver; a transmitter; a transceiver; and/or any other communication interface and/or communication sensor interface configured for testing the AUT.

As an option, the computer-implemented method further comprising controlling the pointing and/or alignment of the payload about at least two axes of rotation, wherein the control assembly is rotatably coupled to the gimbal assembly and the payload is rotatably coupled to the gimbal assembly. As another option, the computer-implemented method, further comprising controlling the pointing and/or alignment of the payload about at least three axes of rotation, wherein the control assembly is rotatably coupled to the gimbal assembly, the payload is rotatably coupled to the gimbal assembly, wherein the gimbal assembly includes a further axis of rotation for use in controlling the pointing and/or alignment of the payload. As another option, the computer-implemented method, wherein the control assembly is rotatably coupled to the gimbal assembly by a first motor, the gimbal assembly further comprising: a first rotating arm coupled to the first motor, the first motor configured to rotate the first rotating arm around a first axis of rotation, the first rotating arm coupled to a second motor at an end of the first rotating arm distal to the coupling of the first rotating arm to the first motor; a second rotating arm coupled to the second motor, the second motor configured to rotate the second rotating arm around a second axis of rotation, the second axis of rotation orthogonal to the first axis of rotation, the second rotating arm coupled to a third motor, wherein the third motor is configured to rotate the payload coupled to the third motor at the second section of the payload about a third axis of rotation, wherein the third axis of rotation is different to the second axis of rotation; and the controller of the control assembly electrically connected to the first motor, the second motor and third motor; wherein controlling the gimbal assembly further comprising: maintaining pointing and alignment of the first section of the payload further comprising controlling one or more of the first motor, second motor, and third motors based on the calculated pointing direction and alignment of the first section of the payload towards the AUT.

As an option, the computer-implemented method, wherein the first axis of rotation is a yaw axis of rotation in relation to the gimbal assembly, the second axis of rotation is a pitch axis of rotation in relation to the gimbal assembly, and the third axis of rotation is a roll axis of rotation in relation to the gimbal assembly.

As another option, the computer-implemented method, wherein the first, second and third motors each comprise at least one from the group of: a gimbal motor; a brushless motor; a brushless gimbal motor; a gimbal drive motor; and/or any suitable motor for use in adjusting and/or maintaining the pointing direction and/or alignment of the first section of payload in the direction of the AUT. As an option, the computer-implemented method, wherein the first, second and third motors corresponding to a yaw motor, pitch motor and roll motor, respectively.

As an option, the computer-implemented method, wherein the control assembly is rotatably coupled to the gimbal assembly by a yaw motor, the gimbal assembly further comprising: a yaw rotating arm coupled to the yaw motor, the yaw motor configured to rotate the yaw rotating arm around a yaw axis of rotation, the yaw rotating arm coupled to a pitch motor at an end of the yaw rotating arm distal to the coupling of the yaw rotating arm to the yaw motor; a pitch rotating arm coupled to the pitch motor, the pitch motor configured to rotate the pitch rotating arm around a pitch axis of rotation, the pitch axis of rotation orthogonal to the yaw axis of rotation, the pitch rotating arm coupled to a roll motor, wherein the roll motor is configured to rotate a payload coupled to the roll motor at the second section of the payload about a roll axis of rotation, wherein the roll axis of rotation is orthogonal to the pitch axis of rotation; and the controller of the control assembly electrically connected to the yaw motor, the pitch motor and roll motor; wherein controlling the gimbal assembly further comprising: maintaining pointing and alignment of the first section of the payload further comprising controlling one or more of the yaw motor, pitch motor, and roll motors based on the calculated pointing direction and alignment of the first section of the payload towards the AUT.

As another option, the computer-implemented method, wherein controlling the gimbal assembly further comprising: calculating the theoretical angles for yaw, pitch and roll of the payload in relation to the AUT; calculating drift offsets of the gimbal assembly based on comparing feedback from data representative of current received position of the aircraft and with attitude and heading reference system of the aircraft for correcting drift in the gimbal assembly; and sending angle commands and drift offsets to a gimbal controller for controlling one or more of the first motor, second motor, and third motors based on combining drift offsets with theoretical angles for yaw, pitch and roll.

As another option, the computer-implemented method, wherein controlling the gimbal assembly further comprising: when using the payload for testing linear polarized systems, controlling the gimbal assembly to maintain polarisation alignment of the payload communication sensor interface polarisation with the AUT polarisation by: comparing the received in-flight position of the aircraft with the received position of the AUT; calculating a theoretical roll adjustment value for at least adjusting the roll angle of the payload in relation to the AUT based on the comparison for maintaining polarisation alignment; and sending a roll angle command to the roll motor of gimbal assembly.

As an option, the computer-implemented method, wherein a base station is located at a geographic position relative to the AUT, the location of the base station defining a reference position for the aircraft during testing of the AUT, and receiving the position of the AUT further comprising: receiving the position of the base station; calculating the position of the AUT based on the geographic position of the AUT relative to the position of the base station.

As another option, the computer-implemented method, wherein the payload further comprises a camera located at the first end of the payload, and receiving the position of the AUT further comprising: analysing one or more image(s) from the camera to identify a position of the AUT; and calculating the position of the AUT based on the identified position of the AUT in said one or more analysed images.

As a further option, the computer-implemented method, wherein: analysing one or more image(s) from the camera to identify a position of the AUT further comprises analysing one or more image(s) from the camera to identify the AUT; and calculating the position of the AUT based on the position of the identified AUT in said one or more analysed images.

As another option, the computer-implemented method, wherein: analysing one or more image(s) from the camera to identify a position of the AUT further comprises analysing one or more image(s) from the camera to identify the base station; and calculating the position of the AUT based on the position of the identified base station in said one or more analysed images and based on the geographic position of the AUT relative to the position of the identified base station.

As an option, the computer-implemented method, wherein the AUT includes a beacon signal and receiving the position of the AUT further comprising: receiving the beacon signal associated with the AUT; and determining the position of the AUT based on the received beacon signal.

As another option, the computer-implemented method, wherein the base station includes a beacon signal and receiving the position of the AUT further comprising: receiving the beacon signal associated with the based station; and determining the position of the AUT based on the received beacon signal from the base station and the geographic position of the AUT relative to the position of the base station.

As a further option, the computer-implemented method, further comprising maintaining pointing of the first section of the payload towards a designated position in relation to the AUT.

As another option, the computer-implemented method, wherein the communication sensor interface is a transceiver and the method further comprising controlling the transceiver of the payload to perform at least one or more from the group of: generate and transmit a continuous wave or modulated test signal in a desired frequency; receive a continuous wave or modulated test signal in a desired frequency; generate and transmit a linearly polarised signal to the AUT; generate and transmit a circularly polarised signal to the AUT; receive a linearly polarised signal from the AUT; and receive a circularly polarised signal from the AUT; any other generation, transmission and/or reception of a signal or wave based as required by the APE for testing the antenna of the AUT.

As an option, the computer-implemented method, wherein the communication sensor interface is a transceiver, the method further comprising controlling the gimbal assembly to perform at least one or more from the group of: pointing an RF transmitting feed horn of the transceiver at a specified geometric point associated with the AUT; cancelling any movements or motion of the aircraft to maintain pointing of the RF transmitting feed horn at the specified geometric point or the AUT; maintaining alignment of the RF transceiver feedhorn polarisation with the corresponding AUT transceiver feedhorn polarisation during testing of the AUT.

As a further option, the computer-implemented method, wherein, when testing the AUT, the method further comprising: adjusting and/or maintaining pointing and/or alignment of the first section of the payload towards the AUT during a flight test route (e.g. a pre-programmed flight test route) of the aircraft in relation to the AUT; receiving at the communication sensor interface measurements associated with at least the main beam of the AUT; and collecting measurement data points associated with at least the main beam azimuth and elevation of the AUT; sending the collected measurement data points and position of aircraft to a control station for use in determining at least the AUT pointing based on analysing the collected measurement data points.

In a second aspect, the present disclosure provides a gimbal stabilisation system for an aircraft comprising a control assembly rotatably coupled to a gimbal assembly comprising a payload, the control assembly comprising a controller configured to operate the gimbal assembly to maintain pointing of a first section of the payload towards an antenna under test, AUT, with a second section of the payload rotatably coupled to the gimbal assembly, wherein the first section comprises a communication sensor interface for use in testing the AUT.

As an option, the gimbal stabilisation system of the second aspect, the gimbal assembly further comprising operating the controller of the gimbal stabilisation system based on the computer-implemented method according to any of the features of the first aspect, combinations thereof, modifications thereto and/or as herein described.

In a third aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method according to any of the features of the first aspect, combinations thereof, modifications thereto and/or as herein described.

In a fourth aspect, the present disclosure provides a system comprising: an aircraft comprising an gimbal stabilisation apparatus according to the second or third aspects, combinations thereof, modifications thereto and/or as herein described; and an antenna under test, wherein the aircraft is configured to perform testing of the AUT using the gimbal stabilisation apparatus.

As an option, the first, second, third and/or fourth aspects wherein the aircraft is an unmanned aerial vehicle.

In a fifth aspect, the present disclosure provides a computer-readable medium comprising computer code or instructions stored thereon, which when executed on a processor, causes the processor to perform the computer implemented method according to any of the features of the first aspect, combinations thereof, modifications thereto and/or as herein described.

In a sixth aspect, the present disclosure provides a system as herein described with reference to the accompanying drawings.

In a seventh aspect, the present disclosure provides a method as herein described with reference to the accompanying drawings.

In an eighth aspect, the present disclosure provides an apparatus as herein described with reference to the accompanying drawings.

In a ninth aspect, the present disclosure provides a computer program product as herein described with reference to the accompanying drawings.

The methods and/or process(es) described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
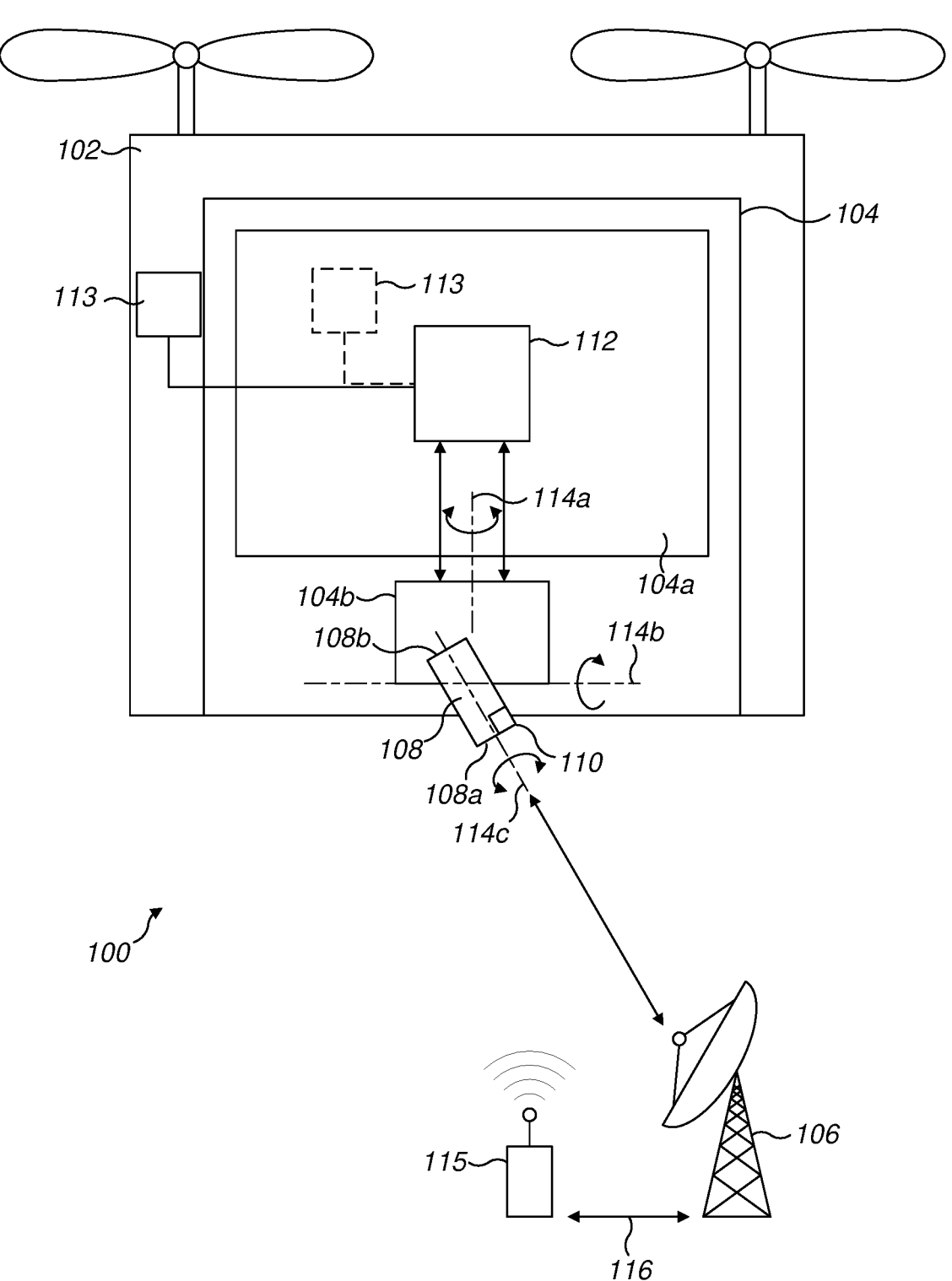
FIG. 1a is a schematic diagram illustrating an example gimbal stabilisation system for use in testing an antenna under test (AUT) according to some embodiments of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) for an aircraft mounted gimbal stabilisation system including an antenna testing payload that is configured to direct the pointing and/or alignment of the antenna testing payload with an antenna under test (AUT) during antenna performance evaluation (APE) procedures and the like. Preferably, the aircraft may be an unmanned aerial vehicle (UAV) with a gimbal stabilisation system mounted thereto including a controller configured for directing and maintaining the pointing and/or alignment of the antenna testing payload towards an antenna under test (AUT) during the antenna evaluation procedure in relation to the AUT. The gimbal stabilisation system is configured to receive position information associated with the AUT, position information associated with the UAV, and calculate the necessary adjustments to the gimbal stabilisation system for maintaining pointing and/or alignment of the antenna testing payload towards the AUT during the antenna evaluation procedure. The gimbal stabilisation system includes a gimbal mechanism mounted to the UAV, where the gimbal mechanism includes a combination of rotatable structural elements controlled by the controller that enable the antenna testing payload to be controllably adjusted, pointed and/or aligned with the AUT independently of the flight path, route and/or attitude of the aircraft or UAV.

In essence, the gimbal stabilisation system with payload provides at least several of the following functionalities and/or capabilities: generate, transmit, and/or receive a test signal at any desired frequency and the like (e.g. in Ku-Band frequencies); uses linear or circular polarisation; pointing the communication interface of the payload (e.g. an RF feed horn) at a specified geometric/geographic point associated with the AUT (e.g. where the AUT is located); cancel any movements from the UAV to keep the communication interface continually pointed towards the AUT (e.g. keep the RF feed horn always pointed at the AUT); and/or keep/maintain alignment of the communication interface with the corresponding communication interface/antenna of the AUT (e.g. maintain alignment of the feedhorn polarisation (linear) with the polarisation of the antenna of the AUT during testing).

Aircraft may comprise or represent any vehicle capable of flying. Examples of aircraft may include, by way of example only but is not limited to, fixed wing aircraft, rotary wing aircraft, helicopter(s), airplane(s), unmanned aerial vehicle(s) (UAV(s)) such as, without limitation, for example drone(s), commercial/civilian drone(s), and the like. For simplicity, the gimbal stabilisation system will be described with reference to a UAV, which is a preferred embodiment of the invention. Such as UAV is capable of being configured and/or operable to have a gimbal stabilisation system and payload (as described herein) mounted thereto and is capable of performing an antenna performance evaluation (APE) for testing performance an AUT as described herein. Although a UAV is described herein for use with the gimbal stabilisation system, this is by way of example only and the invention is not so limited, it is to be appreciated by the skilled person that the gimbal stabilisation system may be applied to, mounted on and/or operated using any type of aircraft for performing antenna performance evaluation procedures and the like and/or as the application demands. However, using UAV(s) capable of being mounted with the gimbal stabilisation system/payload for performing antenna performance evaluation (APE) procedures provides the advantage of enabling a cost effective and portable method of testing the performance of an AUT in situ, at a test site, and/or at a test site prior to installation and the like. Furthermore, the weight of the gimbal system with payload for performing APE's on AUTs is within the UAV payload capability range. Moreover, UAVs are more cost effective than manned aircraft, and the size of UAVs means they are easily transportable to any location where the AUT may be tested.

The structure of the gimbal stabilisation system may include a control assembly and gimbal assembly that are structured and configured for controlling the pointing and/or alignment of the payload about at least two axes of rotation. For example, the control assembly may be rotatably coupled to the gimbal assembly and the payload may be rotatably coupled to the gimbal assembly. As another example, the control assembly may be rotatably coupled to the gimbal assembly, the payload is rotatably coupled to the gimbal assembly. The gimbal assembly may include at least one further axis of rotation for use in controlling the pointing and/or alignment of the payload. In this manner, the gimbal stabilisation system may be structured and/or configured for controlling the pointing and/or alignment of the payload about at least three axes of rotation.

For example, the gimbal stabilisation system of the UAV, when the UAV performs APE procedures (UAV-APE), is configured to use a payload based on, without limitation, for example a directional probe antenna (or other suitable communication interface/communication sensor interface) combined with a 3-axis gimbal stabilising configuration of the gimbal stabilisation system, where the movements from the UAV may be counteracted during the APE of the AUT. By doing this, constant relative probe gain can be maintained, both for, without limitation, for example axial pointing and/or polarization alignment of the probe antenna and the antenna system (or antenna) under test (AUT). The advantages of the gimbal stabilisation system when used with a UAV system, RF technology provides an efficient, accurate and cost effective system for performing APE procedures on an AUT in all types of scenarios. Such scenarios may include, without limitation, for example: antenna type approval; factory antenna acceptance tests; preventative antenna maintenance; antenna installation; antenna verification; antenna comparison. The types of tests and/or APE procedures may include, without limitation, for example: measurement of the electromagnetic propagated/ received field both in co- and cross-polarized planes; antenna misspointing evaluation; gain measurements; definition of antenna blockage zones; antenna main beam and/or side lobe measurements and the like; and/or any other type of suitable measurements/tests for testing the performance of an AUT as the application demands.

Although there are several examples of the structure of the gimbal stabilisation system, control assembly and/or gimbal assembly that are structured and configured to control the pointing direction of a payload about two or three axes of rotation, this is by way of example only and the invention is not so limited, it is to be appreciated by the skilled person that the structure and/or configuration of the gimbal stabilisation system, control assembly, and/or gimbal assembly may be further modified, structured and/or configured to include two, three and/or more axes of rotation as the application demands.

For example, the gimbal stabilisation system may include a control assembly that is rotatably coupled to the gimbal assembly by a first motor, where the gimbal assembly includes the payload. The gimbal assembly may include a first rotating arm coupled to the first motor, the first motor configured to rotate the first rotating arm around a first axis of rotation. The first rotating arm may be coupled to a second motor at an end of the first rotating arm distal to the coupling of the first rotating arm to the first motor. The gimbal assembly includes a second rotating arm coupled to the second motor, the second motor configured to rotate the second rotating arm around a second axis of rotation, the second axis of rotation orthogonal to the first axis of rotation. The second rotating arm coupled to a third motor, wherein the third motor is configured to rotate the payload coupled to the third motor at the second section of the payload about a third axis of rotation, where the third axis of rotation is different to the second axis of rotation. For example the third axis of rotation may be orthogonal to the second axis of rotation. The controller of the control assembly is electrically connected to the first motor, the second motor and third motor, and is configured to control the gimbal assembly for maintaining pointing and/or alignment of the first section of the payload based on controlling one or more of the first motor, second motor, and third motors in relation to a calculated/estimated pointing direction and alignment of the first section of the payload towards the AUT using position information associated with the UAV (e.g. aircraft) and AUT.

The first axis of rotation may be considered a yaw axis of rotation in relation to the gimbal assembly and/or aircraft, the second axis of rotation may be considered a pitch axis of rotation in relation to the gimbal assembly and/or aircraft, and the third axis of rotation may be considered a roll axis of rotation in relation to the gimbal assembly and/or aircraft. Thus the first, second and third motors may correspond to a yaw motor, pitch motor and roll motor, respectively. Furthermore, the first, second and third motors may be based on, without limitation, for example at least one from the group of: a gimbal motor; a brushless motor; a brushless gimbal motor; a gimbal drive motor; an electric motor; and/or any suitable motor for use in adjusting and/or maintaining the pointing direction and/or alignment of the first section of payload in the direction of the AUT.

Although a yaw axis of rotation, a pitch axis of rotation, and a roll axis of rotation may be described herein, this is by way of example only and the invention is not so limited, it is to be appreciated by the skilled person that the gimbal stabilisation system and/or method(s) as described herein may be designed and/or modified to use two, three or more axes of rotation for controlling the pointing and/or alignment of the first section of the payload, modifications thereto, combinations thereof and/or as the application demand. Although a yaw motor (or first motor), a pitch motor (or second motor), a roll motor (or third motor) are described herein, this is by way of example only and the invention is not so limited, it is to be appreciated by the skilled person that the gimbal stabilisation system, apparatus and/or method(s) as described herein may use other mechanisms or means capable or operable for rotating the required parts of the gimbal stabilisation system for controlling the pointing and/or alignment of the first section of the payload in the direction of the AUT and/or as the application demands.

FIG. 1a is a schematic diagram illustrating an example an antenna test system (e.g. UAV-APE system) 100 in which an aircraft (e.g. a UAV) 102 is mounted with a gimbal stabilisation system 104 for use in testing an antenna under test (AUT) 106 according to some embodiments of the invention. In this example, the aircraft is a UAV 102 in which the gimbal stabilisation system 104 includes a control assembly 104a rotatably coupled to a gimbal assembly 104b, where the gimbal assembly 104b includes a payload 108 for use in testing the AUT 106, i.e. an antenna testing payload. For example, the payload 108 may include a first section 108a including a communication sensor interface 110 for use in testing the AUT 106 and a second section 108b rotatably coupled to the gimbal assembly 104b. The payload control assembly 104a may include a controller 112 and/or position receiving apparatus/receiver 113. The controller 112 is configured to receive position information associated with the UAV 102 and/or the AUT 106 for use in controlling the gimbal assembly 104b to maintain the pointing direction/ alignment of the first section 108a of the payload towards the AUT 106 at the appropriate times during an APE procedure of the AUT 106.

The communication interface or communication sensor interface may comprise or represent any type of sensor and/or apparatus for testing the AUT during an APE procedure. Examples of communication interface or communication sensor interface may include, by way of example only but is not limited to, one or more of a receiver; a transmitter; a transceiver; a receiver for receiving RF transmissions from the AUT; a transmitter configured for transmitting RF transmissions to the AUT; a transceiver configured for receiving and/or transmitting RF transmissions to/from the AUT; and/or any other communication interface and/or communication sensor interface configured for use in testing the AUT during, without limitation, for example an APE procedure.

In this example, the gimbal assembly 104b is rotatably mounted on the UAV 102 such that the gimbal assembly 104b controllably rotatable via a first rotation mechanism around a first axis of rotation 114a with respect the UAV 102. The control assembly 104a or the gimbal assembly 104b may include the first rotation mechanism, in which the controller 112 is configured to operate for rotating the gimbal assembly 104b about the first rotation axis 114a. The gimbal assembly 104b further includes a second rotation mechanism configured for movably rotating the payload 108 about a second axis of rotation 114b, in which the second axis of rotation 114b is substantially different to the first axis of rotation 114a. For example, the first and second axes of rotation may be orthogonal to each other. The gimbal assembly 104b further includes a third rotation mechanism configured for movably rotating the payload 108 about a third axis of rotation 114c along, without limitation, for example the longitudinal axis of the payload 108. The third rotation mechanism may be attached to the second section 108b of the payload 108. Thus, the first, second and third rotation mechanisms may be movably controlled by the controller 112 based on data representative of position information associated with the UAV 102 and/or the AUT 106 for use directing and/or maintaining pointing direction/alignment of the first section 108a of the payload 108 of the gimbal assembly 104b towards the AUT 106 during an APE procedure of the AUT 106. The first, second and third axes of rotation may be, without limitation, for example a yaw axis of rotation, a pitch axis of rotation, and a roll axis of rotation in relation to the payload and/or the gimbal assembly.

In operation, the controller 112 is configured to receive, without limitation, for example from position receiving apparatus 113, which be part of the gimbal stabilisation system (e.g. dashed box) or may be located in the UAV (e.g. solid box), data representative of an in-flight positioning information of the UAV 102 during flight in and/or around the AUT 106 and/or during APE testing of the AUT 106. Positioning information of the UAV 102 may comprise or represent any type of information for use in determining the position of the UAV 102 in 3 dimensional space. For example positioning information of the UAV 102 according to embodiments of the invention include, without limitation, for example data representative of one or more of the following types of positioning information: global positioning system (GPS) coordinates of the UAV 102; altitude of the UAV 102; speed or velocity of the UAV 102; heading of the UAV 102; attitude of the UAV 102; inertial measurement unit (IMU) data associated with UAV 102; and/or any other type of positioning information used for determining the position of the UAV 102 in 3-dimensional space as the application demands.

The controller 112 is also configured to receive, from position receiving apparatus 113, data representative of a positioning information of the AUT 106, which can be in relation to the UAV 102 during flight of the UAV 102 in and/or around the AUT 106 and/or during APE testing of the AUT 106. The positioning information of the AUT 106 may comprise or represent any type of information for use in determining the position of the AUT 106 in relation to the UAV 102. The positioning information of the AUT 106 is used by the UAV 102 to determine where the AUT 106 is in relation to the position of the UAV 102 during flight of the UAV 102. For example, positioning information of the AUT 106 according to some embodiments of the invention may include, without limitation, for example data representative of one or more of the following types of positioning information: geographic and/or GPS coordinates of the AUT 106; geographic and/or GPS coordinates of a base station 114 a known distance 116 from the AUT 106; positioning information derived from processing images from an imaging system of the UAV 102 identifying the AUT 106; positioning information based on radio positioning/triangulation of the AUT 106; positioning information based on detecting one or more beam lobes of the AUT 106 and/or maximum RF transmission strength of RF transmissions from the AUT 106 using the communication interface 110 of the payload 108 of the UAV 102; altitude of the AUT 106; speed or velocity of the AUT 106 (e.g. for mobile/non-stationary AUT); heading of the AUT 106; attitude of the AUT 106; IMU data associated with AUT 106; and/or any other type of positioning information used for determining the position of the AUT 106 in 3-dimensional space as the application demands; combinations thereof; modifications thereto; and/or any other type of positioning information for determining the position of the AUT 106 in relation to the UAV 102 during flight of the UAV 102 and/or during APE of the AUT 106 by the UAV 102 as the application demands.

In this example, the controller 112 processes the received positioning information associated with the UAV 102 and also the positioning information associated with the AUT 106 to determine the required adjustments/updates to one or more of the first, second and third rotation mechanisms of the gimbal stabilisation system 104 to ensure the first section 108a of the payload 108 is pointing in the direction of the AUT 106 and, in some cases, the payload 108 is aligned with the AUT 106 (e.g. the RF polarisation reception/transmission of the communication interface 110 of the payload 108 is aligned with the corresponding RF polarisation transmission/reception of the AUT 106). Determining and/or maintaining the pointing of the first section 108a of payload 108 of the UAV 102 is particularly important when the UAV 102 is in flight performing an APE procedure in relation to the AUT 106. In such a case, the UAV 102 may typically be instructed and/or configured in real-time to fly over one or more flight paths whilst using the payload 108 to perform an APE procedure on the AUT 106, where the controller 112 is configured to process the real-time positioning information of the UAV 102 and also the positioning information of the AUT 106 to ensure the payload 108 is efficiently and accurately pointed using the gimbal stabilisation system 104 towards and/or aligned in relation to the AUT 106.

For example, the APE procedure may be configured to determine the pointing accuracy of the AUT 106 whilst in motion on a vehicle in relation to satellite communications to determine whether the AUT 106 meets a standard set of requirements and/or whether adjustments are necessary in relation to the AUT 106. For example, the APE procedure may require that the AUT 106 remains motionless when its electromagnetic radiation pattern is being measured. Thereafter, the APE procedure may require that the base of the AUT 106 (e.g. car, ship, and plane) remain motionless but the antenna of the AUT 106 may be configured to follow the UAV 102 as the UAV 102 traverses a flight path that simulates motion the AUT 106 experiences when in use. This is contrary to the normal operation of the AUT, where the satellite stays fixed relative to Earth, and the ship/car/ plane moves.

In such an APE procedure, the UAV 102 is configured to simulate a satellite using the communication interface 110 of the payload 108 of the UAV 102. Thus, the UAV 102 and communication interface 110 of the payload 108 may be configured to simulate satellite communication with the AUT 106 whilst the base of the AUT 106 remains motionless but the UAV 102 moves along a flight path that simulates motion of the AUT 106 when operating normally. During the APE procedure, the base of the AUT 106 may be kept motionless, but the antenna of the AUT 106 may follow the UAV 102 whilst the UAV 102 is instructed to fly over a flight path simulating the relative real-world motion the AUT 106 may experience during normal satellite communications and/or operating conditions. For example, the AUT 106 may be an antenna system on a ship, such that the flight path simulates real-world motion that a ship may experience whilst at sea (e.g. swells, waves, storms, calm conditions). Alternatively, the AUT 106 may be an antenna system on a ground vehicle, such that the flight path simulates real-world motion the ground vehicle experiences whilst in use (e.g. rough terrain, flat terrain and the like). Simulating motion of the AUT 106 whilst keeping the AUT 106 motionless means the flight paths of the UAV 102 may be very erratic. In such cases, it is important for the UAV 102 to be able to, via the gimbal stabilisation system 104, continuously point/align the communication interface 110 of the payload 108 accurately in the direction and/or in alignment with the AUT 106 during the APE procedure (e.g. when measuring RF performance of the AUT 106 during the APE), to ensure accurate RF measurements for the APE to determine, in this example, the pointing performance of the AUT 106 when in motion and/or any necessary adjustments/calibration that may be required in relation to the antenna system of the AUT 106.

In this manner, the controller 112 of the gimbal stabilisation system 104 control the gimbal assembly 104b by calculating the necessary positioning adjustments to a pointing direction and/or alignment of the first section 108a of the payload 108 relative to the AUT 106 based on the received position information associated with the UAV 102 and the received position information associated with the AUT 106. Based on the calculated positioning adjustments in relation to pointing direction and/or alignment of the first section 108a of the payload 108 of the UAV 102, the controller 112 is configured to control at least one or more of the first, second and/or third rotation mechanisms of the gimbal stabilisation system 104, control assembly 104b and/or the gimbal assembly to rotatably adjust and/or maintain pointing and/or alignment of the first section 108a of the payload 108 towards the AUT 106.

Figure 1B:
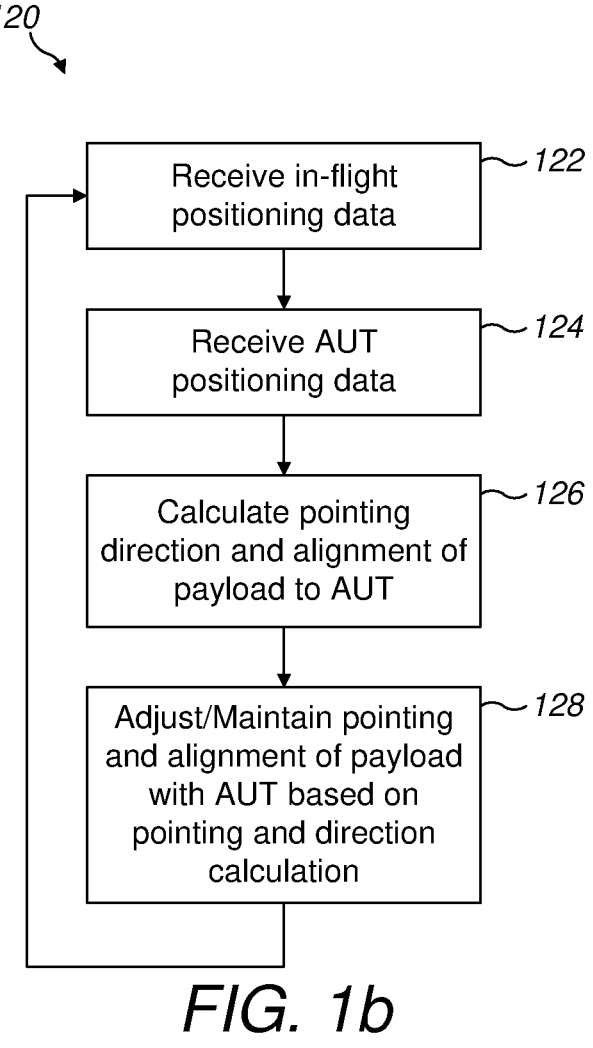
FIG. 1b is a flow diagram illustrating an example gimbal stabilisation process for use with FIG. 1a according to some embodiments of the invention.

FIG. 1b is a flow diagram illustrating an example gimbal stabilisation process 120 for use with a gimbal stabilisation system 104 with controller 112 mounted on an aircraft 102 (e.g. UAV) of FIG. 1a according to some embodiments of the invention. For simplicity, reference numerals in relation to FIG. 1a will be used for similar or the same components and/or features and the like. The gimbal stabilisation process 120 may include the following steps of: In step 122, receiving data representative of an in-flight position of the aircraft 102 during testing of the AUT 106; In step 124, receiving data representative of a position of the AUT 106 in relation to the aircraft 102; In step 126, calculating a pointing direction and/or alignment of the first section 108a of the payload 108 of the aircraft 102 relative to the AUT 106 based on the received data representative of the position of the aircraft 102 and the position of the AUT 106; In step 128, adjusting and/or maintaining pointing and/or alignment of the first section 108a of the payload 108 towards the AUT 106 based on the calculated pointing direction and/or alignment of the first section 108a of the payload 108.

The step of 126 may further include one or more of the following: calculating the theoretical angles for yaw, pitch and roll of the payload 108 in relation to the AUT 106; calculating drift offsets of the gimbal assembly 104b based on comparing feedback from data representative of current received position of the aircraft 102 and with attitude and heading reference system of the aircraft 102 for correcting drift in the gimbal assembly 104b; and sending angle commands and drift offsets to a gimbal controller for controlling the first, second and/or third rotation mechanisms based on combining drift offsets with theoretical angles for yaw, pitch and roll. As an option, the first, second and/or third rotation mechanisms may be a yaw motor, a pitch motor, and/or roll motor, respectively. Although a yaw motor (or first rotation mechanism), a pitch motor (or second rotation mechanism), a roll motor (or third rotation mechanism) are described herein, this is by way of example only and the invention is not so limited, it is to be appreciated by the skilled person that the gimbal stabilisation system, apparatus and/or method(s) as described herein may use other mechanisms or means capable or operable for rotating and/or moving the required parts of the gimbal stabilisation system for controlling the pointing and/or alignment of the first section 108a of the payload 108 in the direction of the AUT 106 and/or as the application demands.

Additionally and/or alternatively, when using the payload 108 for testing linear polarized AUT systems, controlling the gimbal assembly to maintain polarisation alignment of the payload 108 communication sensor interface polarisation with the AUT polarisation based on: comparing the received in-flight position of the aircraft 102 with the received position of the AUT 106; calculating a theoretical roll adjustment value based on the comparison for maintaining polarisation alignment; and sending a roll angle command to the third rotation mechanism (e.g. roll motor) of gimbal assembly 104b.

Referring to FIGS. 1a and 1b, the position of the AUT 106 may be based on using a base station 115 that is located at a geometric/geographic position relative to the AUT 106.

That is, the base station 115 may be located a known distance and heading 116 from the AUT 106. The geometric/ geographic position of the base station 115 or the location of the base station 115 may be used to define a reference position for the aircraft 102 during testing of the AUT 106. Thus, the aircraft 102 only needs to have an accurate position estimate of the base station 115 from which it can infer or calculate an accurate position estimate of the AUT 106 during the calculations for maintaining pointing/alignment of the payload 108 to the AUT 106. Thus, receiving the position of the AUT 106 may further include: receiving data representative of the position of the base station 108; calculating the position of the AUT 106 based on the position of the base station 115 relative to the geometric/geographic position of the AUT 106 using a known distance 116 and/or heading of the base station 115 from the AUT 106.

The aircraft 102 may further include other types of positioning systems or sensors and/or processing capabilities for use in determining the positioning of the AUT 106 in relation to the aircraft 102. For example, the aircraft 102 may further include a camera or imaging system, which may be part of the payload 108 or part of the airframe of the aircraft 102, where images are processed in real-time to identify those images with the AUT 106. Given the time-stamp of the image(s) and identified position within the images of the AUT 106, the imaging system may determine a current position estimate of the AUT 106 and send this positioning information to the controller 112. For example, if the camera of the imaging system is located on the first section 108a of the payload 108, then when the first section 108a of the payload 108 is generally pointing in the direction of the AUT 106, analysis of the image(s) may allow the payload 108 to be targeted based on identifying where in the image(s) the AUT 106 is located, and determining an adjustment to the gimbal assembly 104b and/or gimbal stabilisation system 104, such that the AUT 106 is located in a particular targeting position within the image and/or within any further or subsequent image(s) captured of the AUT 106 by the imaging system. In this manner, the AUT 106 may be tracked visually using image processing techniques and the control of the pointing/alignment of the first section 108a of the payload 108 in the direction of the AUT 106 is main-tained and/or adjusted accordingly.

Alternatively or additionally, the camera or imaging sys-tem may be located at the first section 108a of the payload 108, where the step 122 of receiving the position of the AUT 106 may further include: analysing one or more image(s) captured by the camera/imaging system to identify a posi-tion of the AUT 106 within the image(s); and calculating the geographic/geometric position of the AUT 106 based on the identified position of the AUT 106 in said one or more analysed images. As another example, analysing one or more image(s) from the camera to identify a position of the AUT 106 may further include analysing one or more image(s) from the camera to identify the AUT 106, and calculating the position of the AUT 106 based on the position of the identified AUT 106 in said one or more analysed images.

Should the aircraft 102 (e.g. UAV) be using the base station unit 115 as a reference point for determining the position of the AUT 106, the imaging system may be configured to analyse or image process one or more image(s) captured by the camera of the imaging system to identify a position of the AUT 106 by, without limitation, for example analysing one or more image(s) captured by the camera to identify the base station 115, and thus calculate the position or position information of the AUT 106 based on the position of the identified base station in said one or more analysed images and based on the geometric/geographic position of the AUT 106 relative to the position of the identified base station 115.

Alternatively or additionally, the position of the AUT 106 may be determined based on using a beacon signal. For example, the AUT 106 may include functionality for trans-mitting a beacon signal, and the payload 108 or the aircraft 102 may include functionality for receiving said beacon signal. Thus, the controller 112 receiving data representative of the position of the AUT 106 may include receiving the beacon signal associated with the AUT 106, and determining the position of the AUT 106 relative to the aircraft 102 based on the received beacon signal. Alternatively or additionally, should a base station 115 be used that includes functionality for transmitting a beacon signal, then the controller 112 receiving data representative of position information of the AUT 106 may include the payload 108 and/or aircraft 102 (e.g. UAV) receiving the beacon signal associated with the base station 115, and determining the position of the AUT 106 based on the received beacon signal from the base station 115 and the geometric/geographic position of the AUT 106 relative to the geometric/geographic position of the base station 115.

Figure 2A:
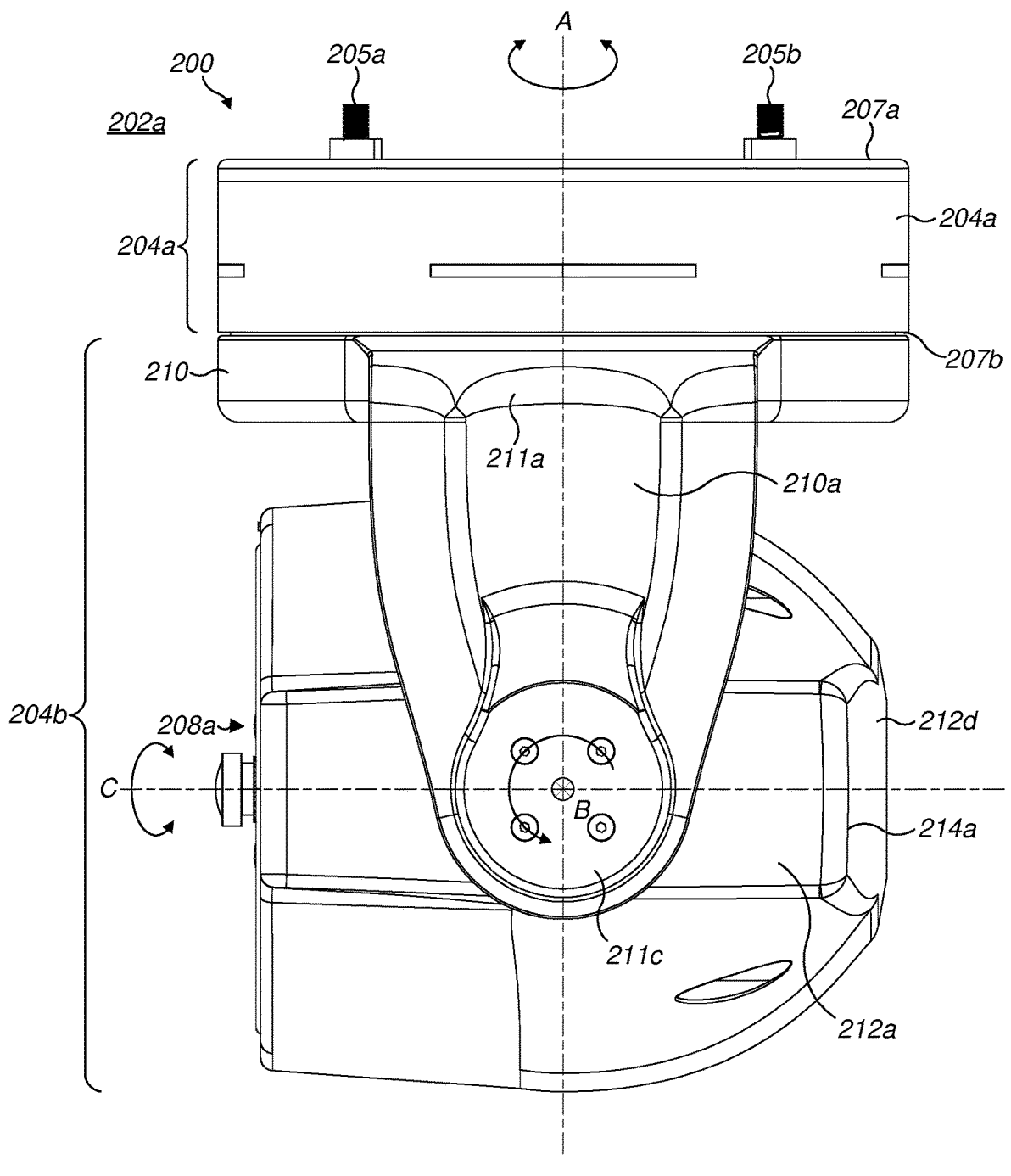
FIGS. 2a and 2b are schematic diagrams illustrating a side view and front view of an example gimbal stabilisation system with a gimbal assembly and payload according to some embodiments of the invention.
Figure 2B:
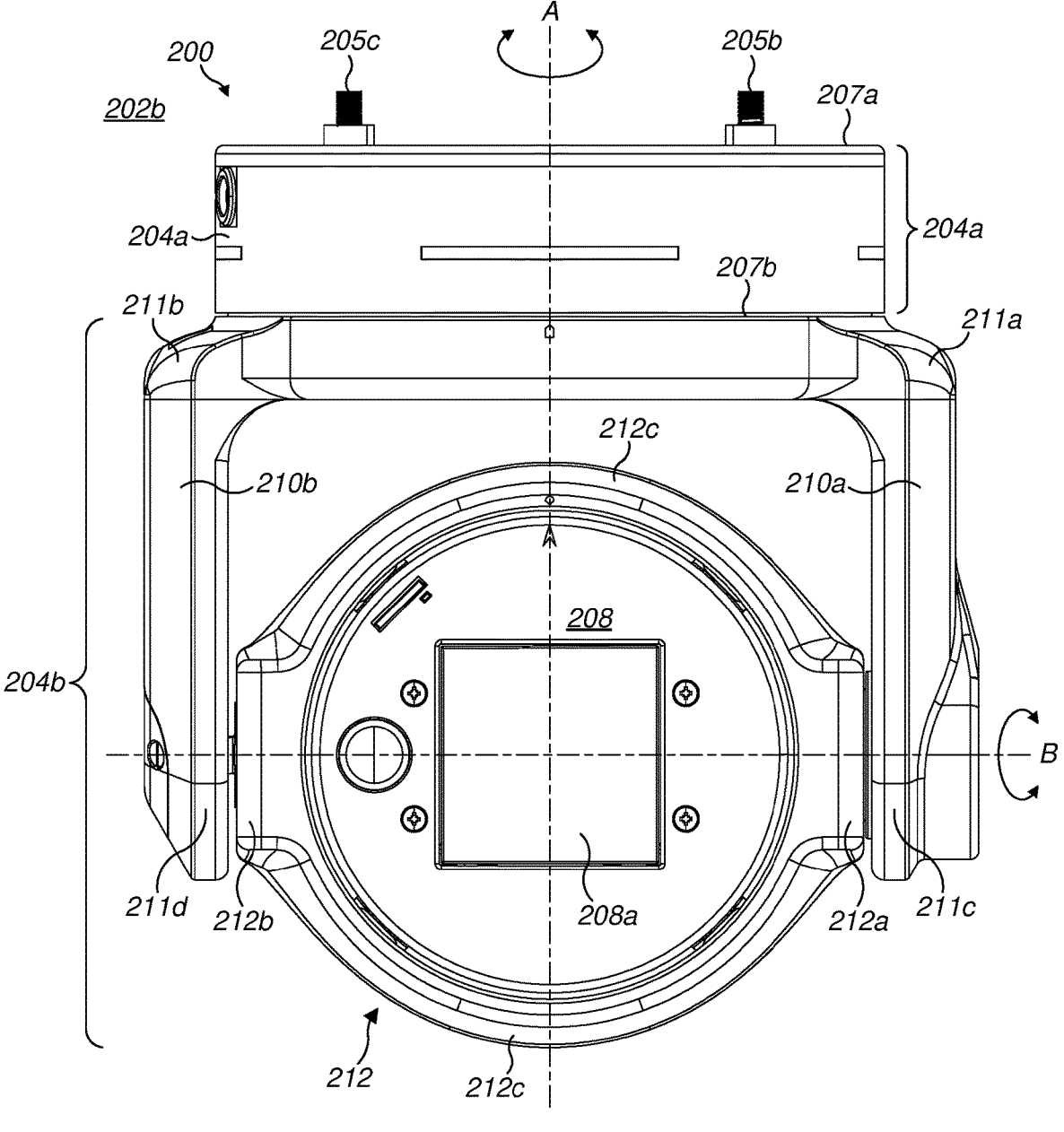
Figure 2C:
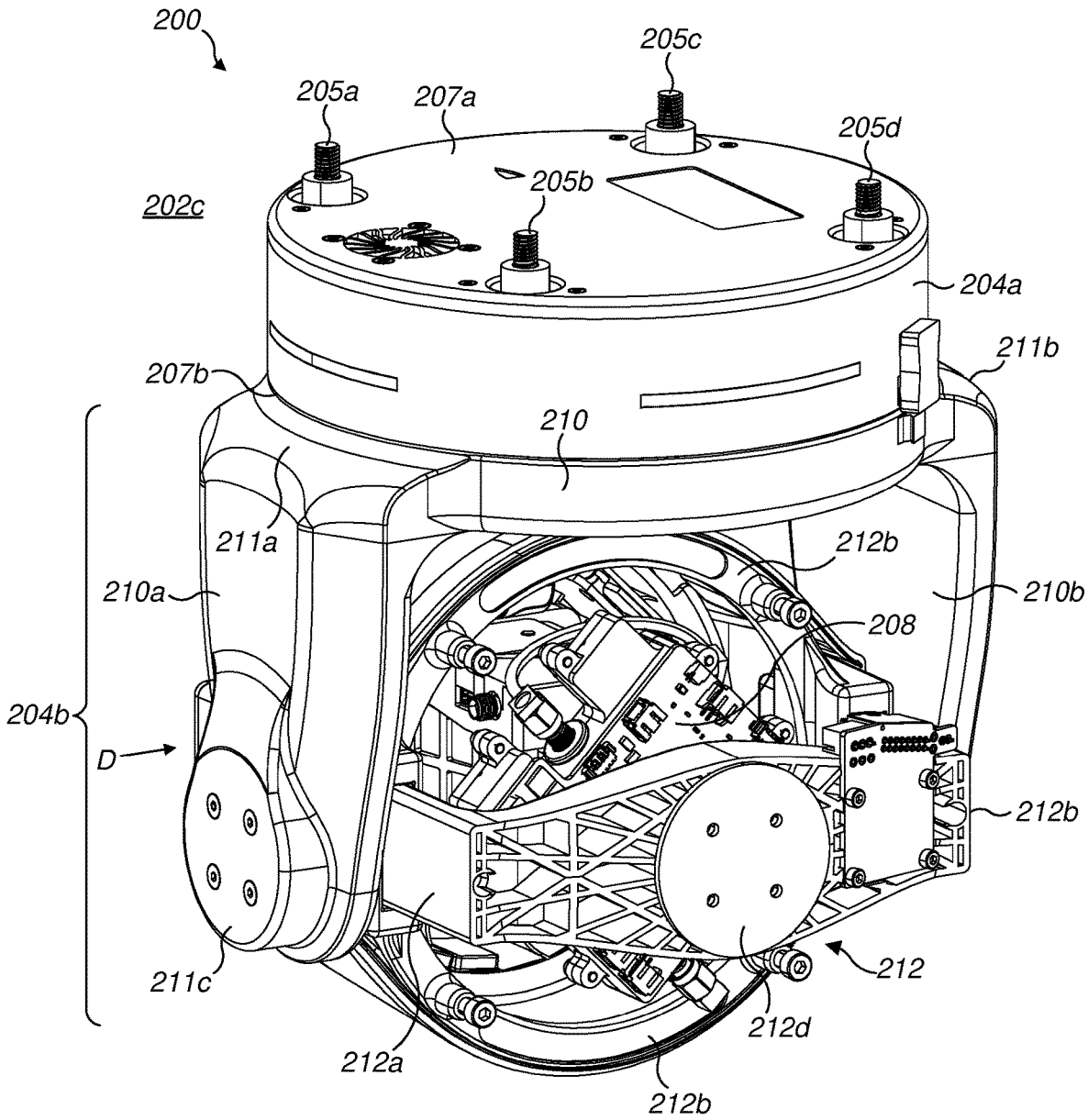
FIG. 2c is a further schematic diagram illustrating a perspective view of the example gimbal stabilisation system according to some embodiments of the invention.
Figure 2D:
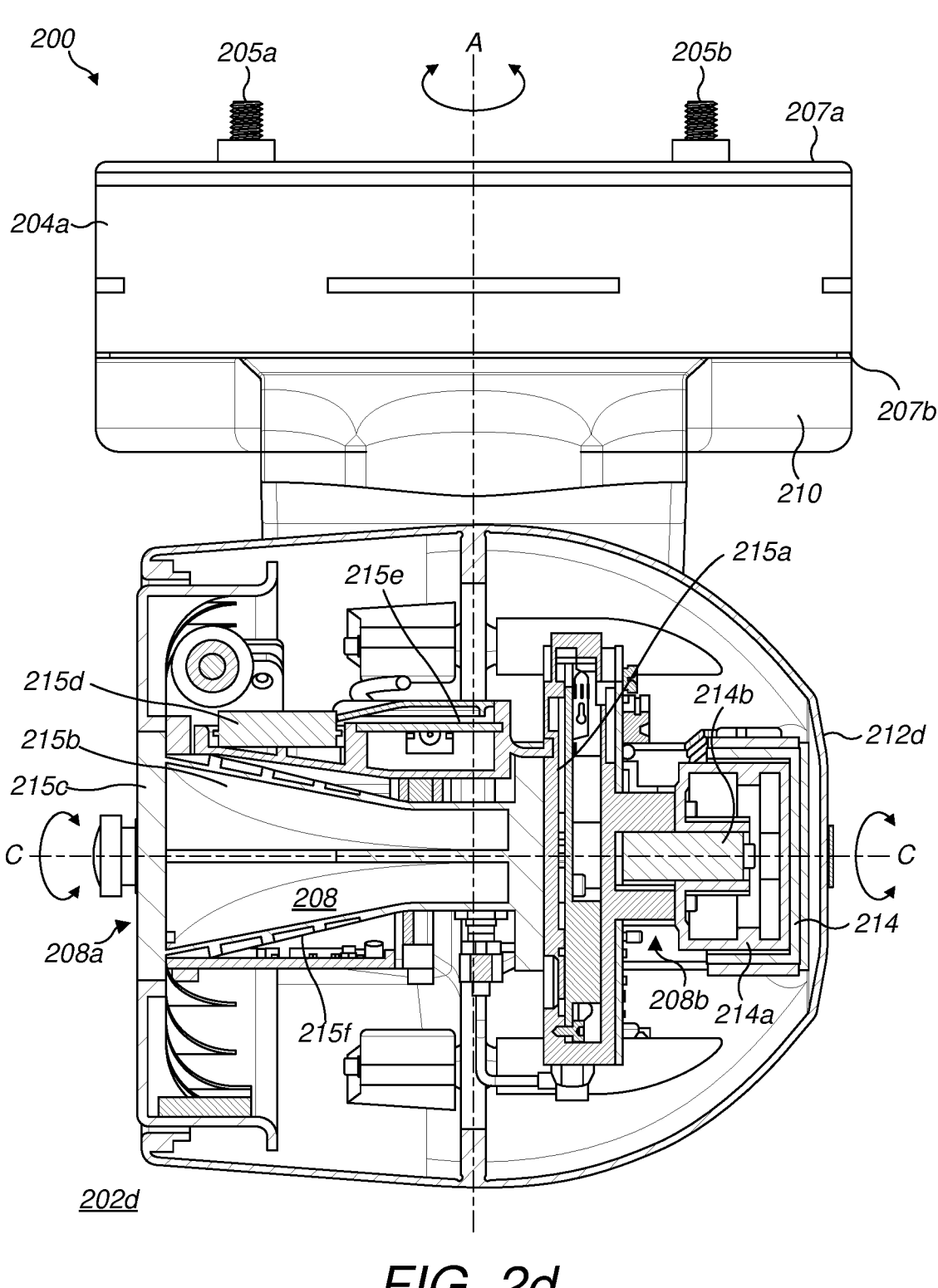
FIG. 2d is a further schematic diagram illustrating a side cross-section view of the example gimbal stabilisation system of FIGS. 2a to 2c according to some embodiments of the invention.

FIGS. 2a to 2d are schematic diagrams illustrating various views 202a, 202b, 202c, 202d of an example gimbal stabi-lisation system 204 according to the invention. FIGS. 2a and 2b are schematic diagrams illustrating a side view 202a and front view 202b of the example gimbal stabilisation system 204 with a controller assembly 204a, a gimbal assembly 204b rotatably coupled to payload 208 according to the invention; FIG. 2c is a further schematic diagram illustrating a rearwards perspective view of the example gimbal stabi-lisation system 200 according to the invention; and FIG. 2d is a further schematic diagram illustrating a side cross-sectional slice view of the example gimbal stabilisation system 200 when viewed in direction of arrow D of FIG. 2c according to the invention. The gimbal stabilisation system 200 is based on the gimbal stabilisation system 104 as described with reference to FIGS. 1a and 1b with further modifications showing further example structural features of the control assembly 202, gimbal assembly 204 and/or payload 208 of gimbal stabilisation system 200. The control assembly 204a and gimbal assembly 204b are configured to provide 3 axes or degrees of freedom to enable a first section 208a of the payload 208 of the gimbal assembly 204b to be controlled and adjusted to maintain its direction and/or alignment with an AUT during an APE procedure. The payload 208 includes a first section 208a of the payload 208 and a second section 208b of the payload 208, where the second section 208b of the payload 208 is rotatably coupled, in this example, to the gimbal assembly 204b.

Referring to FIGS. 2a to 2d, the gimbal stabilisation system 200 includes the control assembly 204a that is rotatably coupled to the gimbal assembly 204b by a first rotating mechanism, (e.g. a yaw motor), and is rotatable about a first axis of rotation A (e.g. yaw axis of rotation in relation to the control assembly 204a) in relation to the control assembly 204a. The control assembly 204a includes a housing with a first surface 207a and a second surface 207b. In this example, the first surface 207a is spaced apart from the second surface 207b and substantially parallel to the second surface 207a of the housing of the control assembly 204a. The first axis of rotation A is also substan-tially orthogonal to the first and second surfaces 207a and 207b of the control assembly 204a. The control assembly 204a includes one or more mounting mechanisms 205a-205d on the first surface 207a of the control assembly 204a. In this example, the mounting mechanism(s) 205a-205d include a plurality of mounting bolts or fixings configured for mounting the gimbal stabilisation system 200 to, without limitation, for example the airframe of an aircraft (e.g. a UAV). The gimbal assembly 204b is rotatably coupled, using the first rotation mechanism, to the control assembly 204a via the second surface 207b of the control assembly 204a.

The gimbal assembly 204b includes a yaw arm assembly 210 with a first yaw rotating arm 210a and second yaw rotating arm 210b connected to the yaw arm assembly 210. The yaw arm assembly 210 may include the yaw motor in which a yaw motor shaft connects to via the second surface 207b of the control assembly 204a, or the control assembly 204a may include a yaw motor in which the yaw motor shaft connects to the yaw arm assembly 210. In any event, when the yaw motor is activated it rotates the yaw motor shaft about the first axis of rotation A such that the yaw assembly 210 rotates about the first axis of rotation A. In this example a first section 211a of the first yaw rotating arm 210a is connected a first portion of the yaw rotation assembly 210 and a first section 211b of the second yaw rotating arm 210b is connected to another portion of the yaw rotation assembly 210. As the yaw rotation assembly 210 rotates about the first axis of rotation A, both the first and second yaw rotation arms 210a and 210b also rotate about the first axis of rotation A (e.g. a yaw axis of rotation).

In this example, the first yaw rotation arm 210a extends outwardly from the yaw assembly 210 in direction substantially along the first axis of rotation A and a direction away from the second surface 207b of the control assembly 204a. Similarly, the second yaw rotation arm 210b extends in a similar manner as the first yaw rotation arm 210a. At the end of the extent of the first yaw rotation arm 210a is a second section 211c of the first yaw rotation arm 210a that is distal to the first section 211a of the first yaw rotation arm 210a. The second section 211c of the first yaw rotation arm 210a is rotatably coupled to a first pitch arm 212a of a pitch rotation arm assembly 212. Similarly, the second yaw rotation arm 210b has a second section 211d of the second yaw rotation arm 210b that is distal to the first section 211b of the second yaw rotation arm 210b. The second section 211d of the second yaw rotation arm 210b is rotatably coupled to a second pitch arm 212b of the pitch rotation arm assembly 212. Both the second sections 211c and 211d of the first and second yaw rotation arms 210a and 210b, respectively, are configured to be rotatably coupled to the first and second pitch arms 212a and 212b of the pitch rotation assembly 212 such that the first and second pitch arms 212a and 212b may rotate around the same second axis of rotation B (e.g. a pitch axis of rotation). The second axis of rotation B is substantially orthogonal to the first axis of rotation A. For example, the second section 211c of the first yaw rotating arm 210a may be rotatably coupled to the first pitch arm 212a of the pitch rotation arm assembly 212 via a pitch motor, whilst the second section 211d of the second yaw rotation arm may be rotatably coupled to the second pitch arm 212b of the pitch rotation assembly 212 via a bearing and the like in which the pitch motor may be used to controllably rotate the pitch rotation assembly 212 about the second axis of rotation B. Alternatively, both the second section 211c of the first yaw rotating arm 210a and the second section 211d of the second yaw rotation arm may be rotatably coupled to the first pitch arm 212a and second pitch arm 212b, respectively, of the pitch rotation arm assembly 212 via corresponding pitch motors, which may be controllable to rotate the pitch arm assembly 212 about the second axis of rotation B. This may be at an end of the yaw rotating arm 210a that is distal to the coupling of the yaw rotating arm 210a to the yaw assembly 210 and/or yaw motor and the like.

The pitch rotating assembly 212 further includes a pitch rotation ring 212c that is configured to guide the payload 208 for rotation about a third axis of rotation C (e.g. a roll axis of rotation), where the third axis of rotation C is substantially orthogonal or perpendicular to the second axis of rotation B. The rear section 212d of the pitch rotating assembly is coupled to a roll motor assembly 214 including a roll motor 214a configured to rotate the payload 208, when coupled to the roll motor 214a in region of second section 208b of the payload 208, about the third axis of rotation C (e.g. the roll axis of rotation). Thus, the payload 208 has three degrees of freedom in relation to the yaw axis, pitch axis, and roll axis. The payload 208 may include a communication sensor interface for use in an APE procedure in relation to an AUT. In this example, as shown in FIGS. 2c and 2d, the communication sensor interface of payload 208 includes a pseudo-satellite assembly for simulating a satellite during an APE procedure in relation to an AUT.

The control assembly includes a controller that is electrically connected to the yaw motor, the pitch motor and roll motor 214a and is configured to adjust and/or the yaw motor, pitch motor and roll motor 214a for maintaining the pointing and/or alignment of the first section 208a of the payload 208 in the direction towards a ground-based target such as, without limitation, an AUT and/or other base station unit and the like as described with reference to FIGS. 1a and/or 1b, 3a-3c and 5, and/or as herein described with and/or as the application demands. The controller is configured to control one or more of the yaw motor, pitch motor, and roll motor 214 based on a calculated adjustment in the pointing direction and/or alignment of the first section 208a of the payload 208 towards, without limitation, for example the AUT.

In this example, as shown in FIG. 2d, the pseudo-satellite assembly of the payload 208 may include, without limitation, for example a signal generator 215a in region of the second section 208b of the payload 208, a dual polarised feed horn 215b (e.g. with 10 dBi Gain) and Radome 215c in the region of the first section 208a of the payload 208, and the like, which are connected together to simulate a satellite transceiver. The payload 208 may further include, without limitation, for example GPS antenna 215d, 10 MHz GPSDO module 215e; inertial movement/measurement unit (IMU) 215f; for use in determining/providing the positioning information of the aircraft and/or the gimbal stabilisation system 200 that is mounted to the aircraft and/or any drift or position information associated with the gimbal stabilisation system 200. The pseudo-satellite assembly of the payload 208 may be used to test AUT that normally communicate with the payload of satellites. When the gimbal stabilisation system 200 is mounted on an aircraft such as, without limitation, for example a UAV, the UAV may act as a pseudo satellite "bus" (e.g. satellites are composed of a "bus" and a payload, which is carried by the "bus") and the payload 208 of the gimbal stabilisation system 200 is a pseudo-satellite assembly payload. Thus, the UAV may be controlled to use the pseudo-satellite assembly payload 208 to determine the pointing accuracy and/or performance of the AUT during an APE procedure. Another example payload 208 is shown, by way of example only but the invention is not so limited, as described with reference to FIGS. 4a and 4b. Although in this example the payload 208 is described as being a pseudo-satellite assembly, this is by way of example only and the invention is not so limited, it is to be appreciated by the skilled person in the art that the payload 208 may be any type of communication interface or communication sensor interface for use in one or more APE procedures in relation to an AUT that is capable of being mounted/coupled to the roll motor of the gimbal assembly 204b and the like.

In particular, in this example, the gimbal stabilisation system 200 configuration provides the payload 208 with 3 degrees of freedom, where these 3 degrees of freedom is illustrated in FIGS. 2a-2d to be in a specific order for efficient and effective operation of the gimbal assembly 104b. The order of the axis of rotation of the 3 degrees of freedom is as follows, from the top: Yaw (e.g. first axis of rotation A), Pitch (e.g. second axis of rotation B), and Roll (e.g. third axis of rotation C). The specific structure that is outlined in FIGS. 2a-2d illustrates is a preferred example of the gimbal assembly 104a structure that is built around these three axes in relation to the payload 208. It has been found that this structure with the yaw, pitch and roll axes and coupling of the yaw, pitch and roll motors provides the best manoeuvrability of the payload 208 to ensure it can be pointed and/or aligned with the AUT for most, if not all, flight paths and/or attitude that a UAV (or other aircraft) may take and/or experience when performing APE procedures on an AUT. Although a specific order of the axis of rotation of the 3 degrees of freedom has been described, this is by way of example only and the invention is not so limited, it is to be appreciated by the skilled person that the structure and/or design of the gimbal stabilisation system 200 may be modified further to include, without limitation, for example a different ordering of two, three or more axes of rotation in the corresponding two, three or more degrees of freedom and/or as the application demands.

As described, the gimbal stabilisation system 200 includes a control assembly 204a and a gimbal assembly 204b. In this example, the control assembly 204a is an electronics housing that includes, without limitation, for example circuit boards (e.g. one or more controllers) and an electrical harness interface with the UAV (or other aircraft structure) and/or the gimbal assembly 204b. As briefly described with reference to FIGS. 2a-2d, the control assembly 204a includes the mounting system 205a-205d for mounting the gimbal stabilisation system 200 to a UAV, which may further include a vibration dampening system. The vibration dampening system may absorb vibrations coming from the UAV which could otherwise cause issues for communication interfaces, sensors and vibrations in the structure of the gimbal stabilisation assembly 200.

The gimbal assembly 204b is attached to the control assembly 204a via a yaw motor which connects to the yaw rotating arm assembly 210 of the gimbal assembly 204b. The structure of the gimbal assembly 204a may be reinforced internally using composite plates through the yaw rotating arms 210a and 210b, and the remaining structural elements 212, 212a-212d may be, without limitation, for example made of a non-conductive polymer material and/or any other material that can withstand UAV vibrations whilst holding the payload.

In the second section 211c of the first yaw rotating arm 210a, a pitch motor may be located, where the second section 211d of the second yaw rotating arm 210b on the opposite side of the gimbal assembly 204b may be located a bearing and axle assembly. Attached to the pitch motor within the second section 211c is the pitch assembly 212 that includes pitch rotating arms 212a, 212b and/or pitch rotating ring 212d, which provides structural support to the payload 208 housing and an adjustable sliding shoe for the pitch rotating arm 212c. The payload 208, in this example, is a pseudo-satellite. The pitch rotating arm 212a or 212b can be adjusted in the pitch rotating ring 212c to balance the payload 208 (e.g. pseudo-satellite assembly) around the second axis of rotation C (e.g. pitch axis).

The payload 208 may be powered by the UAV through an interface cable inside of the electrical housing of the control assembly 204a. The controller operations of the UAV may be powered and/or performed by a controller that may include, without limitation, for example a gimbal controller board and a microcomputer which is integrated on a motherboard in the electrical housing of the control assembly 204a. The motherboard distributes power and signal channels between, without limitation, for example the gimbal controller board, microcomputer, motors of the control/gimbal assemblies 204a/204b, encoders, sensors, and serial connections to devices in the payload 208. An electrical harness is connected to the motherboard in the control assembly 204a, which runs through the gimbal assembly 204b and yaw assembly 210 (e.g. yaw rotating housing) via first yaw rotation arm 210a to the pitch motor and via the bearing on the opposite second yaw rotation arm 210b. The harness terminates in the rear section 212d of the pitch assembly 212 such as, without limitation, for example pitch rotating arm 212c. A roll motor assembly 214 is coupled or attached to the rear section 212d of the pitch assembly 212, the roll motor assembly 214 including, without limitation, for example a roll motor 214a and corresponding N-channel slip ring 214b. The payload 208 is attached via a second section 208b of the payload 208 to the roll motor assembly 214. The connection through to the second section 208a of the payload 208 of the pseudo-satellite assembly may be via, without limitation, for example the N-channel slip ring 214b (e.g. a 12-channel slip ring), located inside the roll motor assembly 214, which includes the roll motor 214a etc. In some examples, the external cables from the slip ring 214b (stationary) is connected to a harness interface PCB on the pitch rotating arm 212a/212b, the rotating cables from the slip ring 214b are connected to the second section 208b of the payload 208, which in this case may be the power and signal distribution board on the rear of the frequency synthesizer housing (e.g. signal generator 215a) of the pseudo satellite assembly of the payload 208. The power and signal distribution board may convert power from the motherboard and distributes the serial connections to devices and sensors from the controller of the controller assembly 204a, the controller includes, without limitation, for example a microcontroller and/or a gimbal controller and the like.

The payload 208 includes a communication interface and/or communication sensor interface. In this example, the communication interface may include, without limitation, for example an RF system including a dual channel microwave signal generator 215a located in the region of the second section 208b of the payload 208, the second section 208b being coupled to the roll motor 214a of the roll motor assembly 214 and a dual polarized linear feedhorn 215b located in the region of the first section 208a of the payload. It is the first section 208a of the payload 208 that is directed by the controller using the control assembly 204a and/or gimbal assembly 204b to point and/or be aligned in the direction of the AUT during an APE. The payload 208 may further include a GPS disciplined oscillator (GPSDO) 215e including, without limitation, for example a 10 MHz reference clock. In this example, the signal generator 215a can supply a clean wave signal at a single frequency between 10 MHz and 24 GHz. The amplitude of the signal generator can be adjusted from −40 dBm to +18 dBm. The signal generator 215a is frequency stabilised using a 10 MHz GPSDO 215e. This module is connected to a GPS antenna 215d, and the 10 MHz reference signal output is connected to the signal generator 215a. Each channel of the signal generator 215a is connected to each individual channel on the linear polarized feedhorn 215b of the first section 208a of the payload 208. In this example, the feedhorn 215b is a linear polarized dual channel feedhorn 215b. The two linear polarized channels are perpendicular to each other. The gain of the feedhorn 215b is rated at typical 12 dB, with a 3 dB beam width of 77-24° (depending on frequency) and cross polar isolation of min. 30 dB. On the front of the feedhorn 215b, a weather protecting Radome 215c is attached.

Figure 3A:
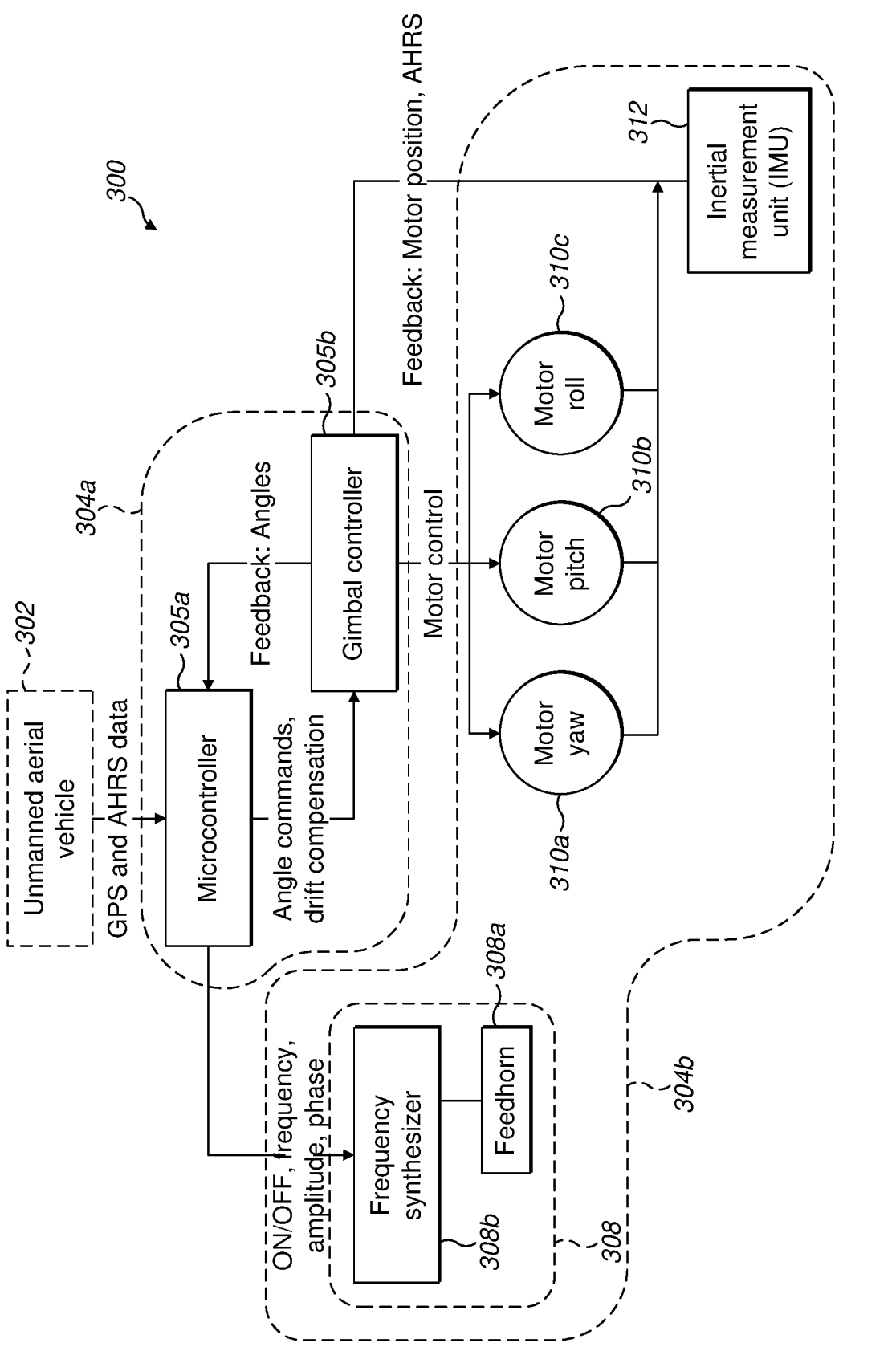
FIG. 3a is a schematic diagram illustrating another example gimbal stabilisation system for use in testing an AUT according to some embodiments of the invention.

FIG. 3a is a schematic diagram illustrating another example gimbal stabilisation system 300 for use in testing an AUT according to some embodiments of the invention. The gimbal stabilisation system 300 is based on the gimbal stabilisation system 104, 200 as described with reference to FIGS. 1a to 2d, modifications thereto, combinations thereof and/or as the application demands. In this example, the gimbal stabilisation system 300 is coupled to a UAV 302 and includes a control assembly 304a and a gimbal assembly 304b for controlling payload 308. The control assembly 304a is connected to the UAV 302, gimbal assembly 304b and the payload 308. The control assembly 304a includes a controller that includes, in this example, a microcontroller 305a and gimbal controller 305b connected together. The control assembly 304a is further connected to the gimbal assembly 304b, which includes a yaw motor 310a, pitch motor 310b, and roll motor 310c connected to the gimbal controller 305b and that are configured to adjust, direct and/or maintain the pointing and/or alignment of the first section 308a of the payload 308 towards an AUT during an APE procedure under control of the gimbal controller 305b and/or the microcontroller 305a. As described herein, the first section 308a of the payload 308 may be a feedhorn and the second section 308b of the payload 308, which is connected to the feedhorn, may be a frequency synthesizer, which is also connected to the microcontroller 305a of the controller of the control assembly 304a. An inertial measurement unit (IMU) 312 of the gimbal assembly 304b may be connected to the gimbal controller 305b for providing AHRS data for use in determining adjustments to the yaw, pitch and roll motors 310a-310c. In addition, the yaw, pitch, and roll motors 310a-310c may also feedback motor positions to the gimbal controller 305b for use in determining adjustments required.

The gimbal controller 305b of the gimbal stabilisation system 300 may be powered by a gimbal microcontroller board, which may be connected via a serial interface to microcontroller 305a (e.g. a microcomputer). The gimbal controller 305b is connected to motors 310a-310c of the control assembly 304a and/or gimbal assembly 304b, and sensors such as, without limitation, for example inertial measurement unit (IMU) 312 and/or absolute encoders. The gimbal controller 305b may include one or more gimbal control modules/components and/or gimbal control software/hardware that uses a feedback loop control with information from sensors 312 and/or motors 310a-310c to control the motors 310a-301c which in turn moves, without limitation, for example the gimbal yaw rotation assembly, yaw rotation arms, pitch rotation assembly, pitch rotation arms, pitch rotation ring, roll assembly and/or other gimbal joint structures. The primary function for the gimbal controller 305a is to stabilize the gimbal assembly/control assembly against external movements of the UAV (e.g. flight path, attitude, air turbulence, heading, direction, etc. of the aircraft/UAV) and maintain/adjust pointing and/or alignment of the payload towards the AUT during an APE procedure in relation to such external movements. A secondary function for the gimbal controller 305b is to accept movement commands from the microcontroller 305a (e.g. an on-board microcomputer). The microcontroller 305a includes software/hardware components that is configured to sends commands for movement to the gimbal controller 305b.

For example, the controller of the control assembly 304a includes the microcontroller 305a and the gimbal controller 305b. The controller is configured to operate to receive position information (e.g. GPS/AHRS data associated with UAV/aircraft and/or AUT and the like) associated with the UAV/aircraft and receive position information associated with the AUT, compute adjustments to the rotation mechanisms (e.g. yaw, pitch, roll motors and gimbal assembly arms/rotation rings etc.) of the gimbal assembly/control assembly for maintaining pointing/alignment of the feedhorn 308a of the payload 308 of the gimbal stabilisation system 300 in the direction of the AUT during APE procedures in which the microcontroller 305a operates frequency synthesizer 308b/308a accordingly for performing APE tests and the like.

In operation, the microcontroller 305a is configured to receive and/or retrieve position information of the UAV and/or position information associated with the AUT based on, without limitation, for example global positioning system (GPS) and/or attitude heading reference system (AHRS) of the UAV and/or AUT and the like. As described with reference to FIG. 1a-1b, positional information associated with the AUT may be derived from other sources and/or positional/imaging systems and the like as the application demands. The microcontroller 305a processes the received or retrieved position information to calculate and send commands to the gimbal microcontroller 305b which in turn is configured to control the yaw, pitch and/or roll motors 310a-310c of the gimbal assembly 304b to point the payload 308 (e.g. feedhorn 308a) of the gimbal assembly 304b at a predefined positional coordinate (e.g. GPS coordinate) associated with the AUT. The microcontroller 305a is also able to command the gimbal controller 305b in any way which can be defined by the user of the UAV/aircraft using the gimbal stabilisation system 300, this may include, without limitation, for example polarization adjustment and/or calibration procedures and the like as the application demands. As an option, the microcontroller 305a and/or a microcomputer of the UAV may be configured to store data including, without limitation, for example flight data, RF data positional data, and/or other data required by the APE procedure for analysing the AUT and the like from sensors (e.g. feedhorn, IMU, GPS, communication suite etc.) and the UAV/aircraft, which can be used for real-time processing and/or post processing and plotting performance of the AUT, without limitation, for example, AUT RF radiation patterns, beam lobes, pointing, directionality, alignment and any other properties, parameters and/or characteristics of the AUT that requires performance evaluation and the like and/or as the application demands.

Figure 3B:
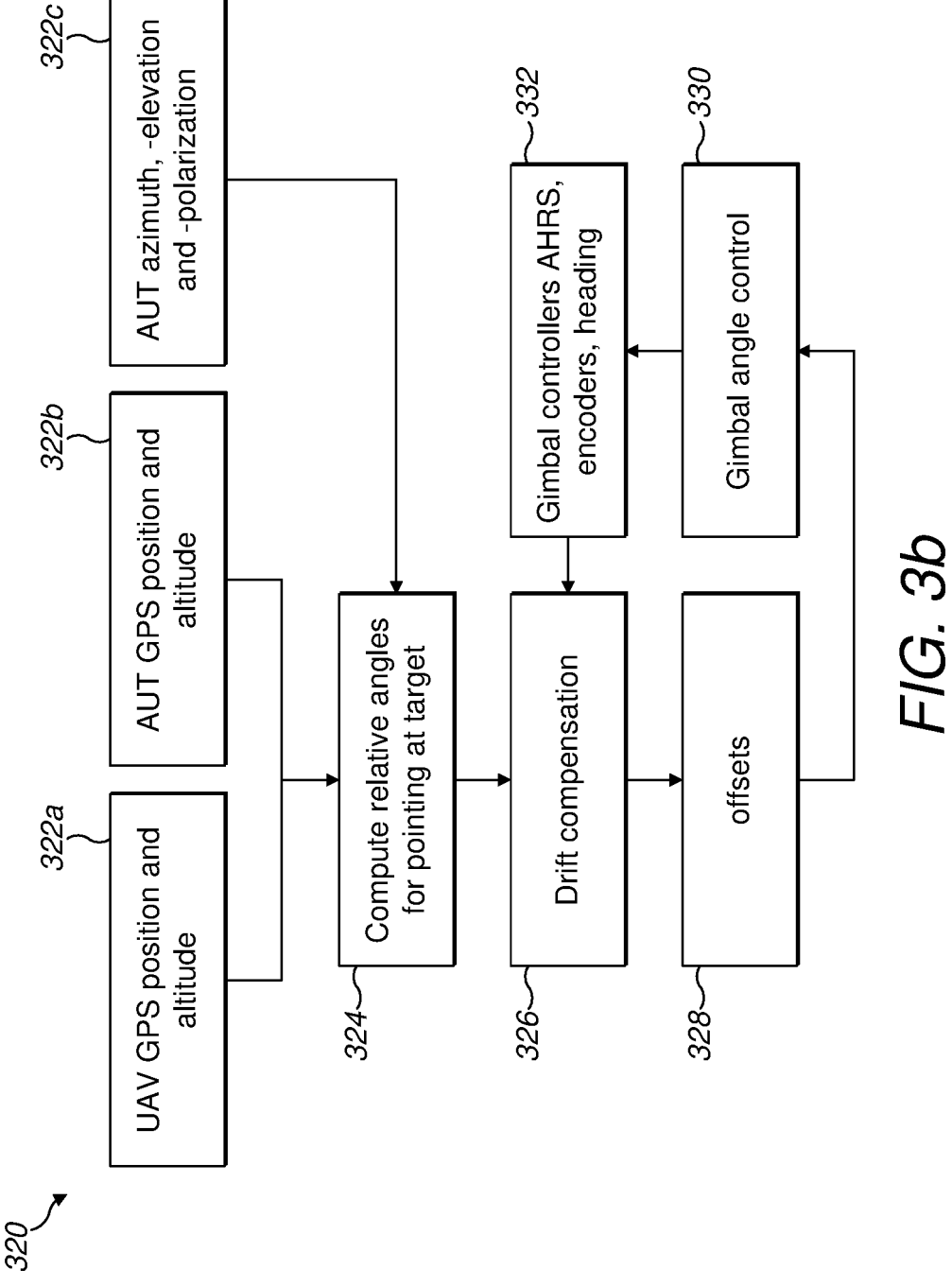
FIG. 3b is a flow diagram illustrating another example gimbal stabilisation process for use with FIG. 3a according to some embodiments of the invention.

FIG. 3b is a flow diagram illustrating another example gimbal stabilisation process 320 for use with gimbal stabilisation system 300 of FIG. 3a and/or gimbal stabilisation systems 100 and/or 200 as described with reference to FIGS. 1a to 2d, combinations thereof, modifications thereto and/or as described herein according to some embodiments of the invention. The gimbal stabilisation process 320 may be performed by the controller of the gimbal stabilisation system 300, which includes, by way of example only but is not limited to, a microcontroller 305a and a gimbal controller 305b. The microcontroller 305a may perform most of the processing in relation to determining the corrections required for the gimbal assembly 304b to direct and/or maintain the pointing of the payload 308 (e.g. feedhorn 308a of the payload 308) and/or alignment of the payload 308 with the AUT. The gimbal stabilisation process 320 may include the following steps of: In step 322a receiving positional information associated with the aircraft/UAV such as, without limitation, for example UAV GPS position and altitude. In step 322b, receiving positional information associated with the AUT such as, without limitation for example AUT GPS position and/or altitude. In step 322c, receiving further positional information associated with the AUT and/or APE procedure being performed on the AUT including, without limitation, for example AUT Azimuth, AUT elevation, and/or AUT polarisation. In step 324, processing the received positional information associated with the UAV/aircraft and the AUT received in steps 322a-322c in which relative angles for pointing a first section 308a of the payload 308 (e.g. feedhorn) at a target (e.g. the AUT) are calculated. The target may be the AUT that is being tested during an APE procedure. Thus, a pointing direction and/or alignment of the first section 308*a* of the payload 308 relative to the AUT based on the received positional information of the UAV and/or AUT may be calculated. This is then used to control the yaw, pitch and roll motors 310*a*-310*b* of the gimbal assembly 304*b*. In step 326, drift compensation is also calculated based on the current computed angles and/or motor positions 310*a*-310*c* fed back from the gimbal assembly controller 305*b* in step 332.

In step 328, one or more offsets are computed based on the relative angles and computed drift compensation of steps 324 and 326, the offsets may be used to control and adjust the yaw, pitch and/or roll motors of the gimbal assembly 304*b* to adjust the pointing and/or alignment of the payload 308 in relation to the AUT. In step 330, angle commands, drift compensation, and/or gimbal angle control instructions are sent to the gimbal controller 305*b*, which performs motor control of the yaw, pitch and/or roll motors 310*a*-310*c* of the gimbal assembly 304*b* in accordance with the received angle commands, drift compensation, and/or gimbal angle control instructions. Thus, adjustment and/or maintenance of the pointing and/or alignment of the first section 308*a* (e.g. feedhorn) of the payload 308 towards the AUT may be achieved. This is based on the calculated pointing direction and/or alignment of the first section 308*a* of the payload 308. The gimbal assembly 304*b* may also provide status/positional feedback including data representative of, without limitation, for example the gimbal yaw, pitch and/or roll motor encoders, yaw, pitch and/or roll motor positions, and/or AHRS data of the UAV such as, without limitation, for example heading, attitude, and other flight data of the UAV. This may be provided via, without limitation, for example from the gimbal motors 310*a*-310*c* and/or IMU 312 or other sensors and the like. In step 332, the status/positional feedback data associated with the gimbal assembly 304*b* may be received from the gimbal controller 305*b* (e.g. data representative of AHRS, encoders, heading, attitude etc.), which is fed into the drift compensation step 326 for calculating drift associated with the position of the motors and/or UAV and the like, which may be combined with the required relative angles for pointing the payload at the target (e.g. AUT).

In this example, the gimbal stabilisation process 320 operates, in steps 322*a*-322*c*, by taking positional data from the UAV and AUT in relation to GPS position, heading and attitude and information about the AUT. With this positional data the gimbal stabilisation process 320 in step 324 calculates the theoretical angles for yaw, pitch, and roll required to ensure the payload 308 is pointing towards and/or aligned with the AUT. After calculating the theoretical angle values, in step 326 a drift compensation routine/algorithm checks any received feedback data that the gimbal controller 305*a* receives from the yaw, pitch, roll motors 310*a*-310*c* and/or IMU 312 and other sensors, which includes data representative of motor positions, current UAV heading and attitude and the like and compares it with, for example, the UAV compass system and/or GPS coordinates and the like. In this way the gimbal stabilisation process 320 is configured to correct any potential drift in the system with reference to the UAV AHRS and GPS position. After step 326, offsets associated with any drift that is to be compensated for in relation to the yaw, pitch and/or roll motors 310*a*-310*c* and/or position of the UAV can be applied to the computed angles, which are then output, in step 330 to the gimbal controller 305*b* as angle commands/instructions etc. For example, the offsets applied can be based on, without limitation, for example, constant offsets, mechanical structure offsets or sensor misplacement/miscalibration and the like. The gimbal controller 305*b* sends control instructions to the yaw, pitch and/or roll motors 310*a*-310*c* in relation to the corresponding angle instructions/commands from the microcontroller 305*a*. Thus, pointing direction and/or alignment of the first section 308*a* of the payload 308 relative to the AUT is maintained, especially during APE procedures in relation to the AUT whilst the UAV is in flight.

In this example, the gimbal stabilisation process 320 may be performed by the microcontroller 305*a* and/or in part by gimbal controller 305*b*. Although the controller of the control assembly is described and illustrated with reference to a microcontroller 305*a* and a gimbal controller 305*b*, this is by way of example only and the invention is not so limited, the skilled person in the art would understand that the controller of the gimbal stabilisation system 300 may be implemented using, without limitation, for example one or more processors, sensors, microcontroller(s) and/or any other hardware/software solution, combination thereof, modifications thereto and/or as the application demands.

Figure 3C:
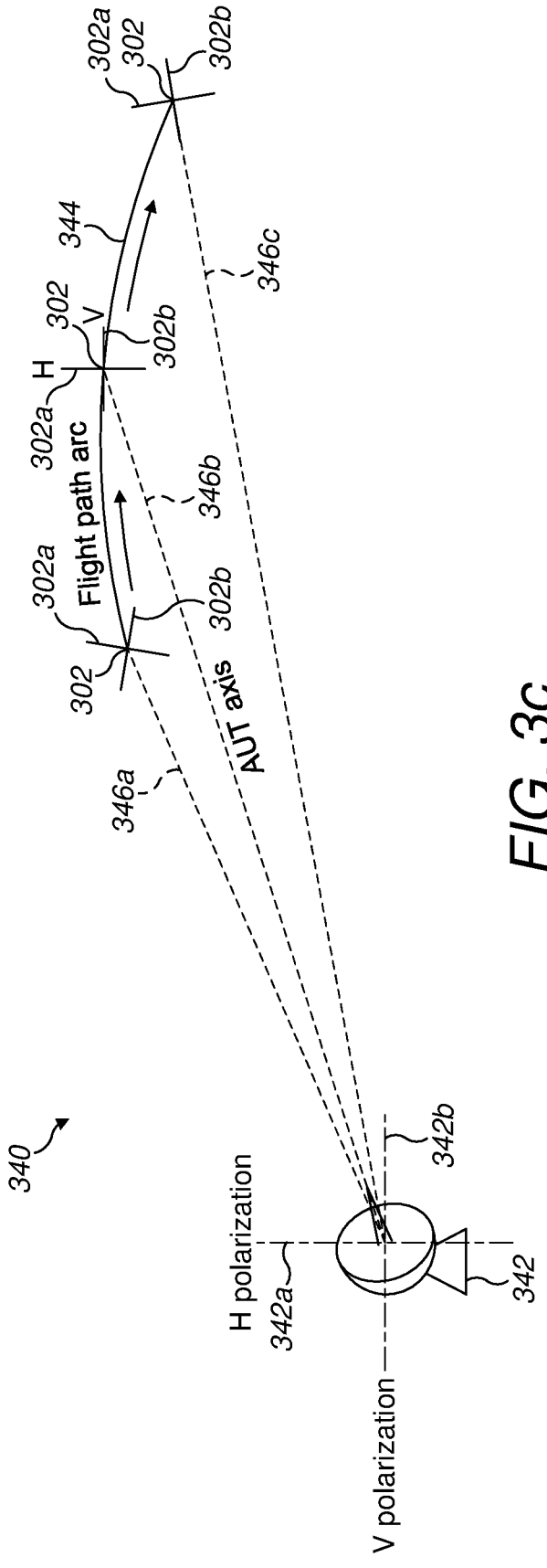
FIG. 3c is a schematic diagram illustrating an testing system using the gimbal stabilisation system according to some embodiments of the invention.

FIG. 3*c* is a schematic diagram illustrating a UAV testing system 340 using the gimbal stabilisation process 320 of FIG. 3*b* and gimbal stabilisation system 300 in an APR procedure in relation to an AUT 342 according to some embodiments of the invention. In this example, the UAV testing system 340 is configured for testing linear polarized antenna systems, thus the gimbal stabilisation process 320 and payload 308 are further modified to take into account ensuring alignment of the payload 308 of the UAV 302 with the AUT 342 whilst the UAV 302 traverses a flight path/route 344 during the APE procedure. This is to ensure there is polarisation alignment between the feedhorn 308*a* of the payload 308 and the corresponding antenna of the AUT 342. Thus, the gimbal stabilisation system 300 and process 320 may be further modified to track the attitude of the feedhorn 308*a* and/or the gimbal assembly 304*b* to ensure the feedhorn 308*a* is in alignment with the linear polarised antenna of the AUT 342.

In FIG. 3*c*, the UAV 302 testing system 340 is testing a linear polarised antenna of an AUT 342 in which the UAV 302 traverses a flight path arc 344. The UAV 302 is represented by crosses made up of orthogonal H polarisation and V polarisation lines 302*a* and 302*b*, respectively, (referred to as UAV H-V cross 302*a*/302*b*) which represent the orientation of the feedhorn 308*a* of the UAV payload 308. The linear polarised antenna of the AUT 342 also has H polarisation and V polarisation lines 342*a* and 342*b*, respectively, (referred to as AUT H-V cross 342*a*/342*b*. As can be seen, at a first instance in time 346*a* of the UAV 302 on the flight path arc 344, the UAV H-V cross 302*a*/302*b* is misaligned with the AUT H-V cross 342*a*/342*b*, thus the feedhorn 308*a* of the payload 308 may not be performing an accurate APE procedure. As mentioned above, feedhorn 308*a* alignment of the UAV payload 308 is required for accurate testing of linear polarized antenna systems. In such scenarios, not only should the first section 308*a* of the payload 308 (e.g. feedhorn 308*a* of the payload 308) be pointing in the direction of the AUT 342 as the UAV traverses flight path arc 344, it should also align the AUT feed polarization with the test probe/feedhorn polarization of the payload 308. That is, the UAV H-V cross 302*a*/302*b* should also align with the AUT H-V cross 342*a*/342*b*. When the AUT 342 has an elevation angle of >0°, there will be a relative polarization angle difference as the UAV 302 moves/flies around the AUT 342 with respect to ground. In this case, to ensure the polarization is aligned, i.e. the UAV H-V cross 302a/302b is aligned with the AUT H-V cross 342a/342b, the feedhorn 308a angle with respect to ground must also change accordingly.

Thus, the gimbal stabilisation process 320 may include the further modifications of: In step 324 of gimbal stabilisation process 320, which may be performed by microcontroller 305a, can be further modified to control the polarisation alignment of the payload 308 based on: reading the GPS position from the UAV 302; comparing the GPS position of the UAV 302 with the AUT GPS coordinates; calculating a theoretical alignment angle through which the feedhorn 308a of the payload 308 should be adjusted towards based on the comparison; and/or calculating a theoretical roll adjustment value based on the comparison; and in step 330 sending an roll angle instruction/command (e.g. taking into account any drift/offsets and the like in steps 326 and 328 of process 320) to the gimbal controller 305b. The gimbal controller 305b may receive the roll angle instruction/command and control/operate the roll motor 310a of the gimbal assembly 304b to adjust its orientation accordingly. Thus the feedhorn 308a of the UAV 302 may be brought into alignment with the polarisation. Should the UAV 302 move outside of the principal planes (e.g. planes that align with H and V polarization of the AUT), such as at time step 346c, then a mathematical method of polarisation adjustment may instead be applied in step 324 for calculating a correcting roll (polarization) angle for the transmitting probe or feedhorn 308a of the payload 308 on the UAV 302. The principal behind the mathematical method of polarisation adjustment is described in the article by A. Ludwig, "The definition of cross polarization," in *IEEE Transactions on Antennas and Propagation*, vol. 21, no. 1, pp. 116-119, January 1973, and herein incorporated by reference.

Figure 4A:
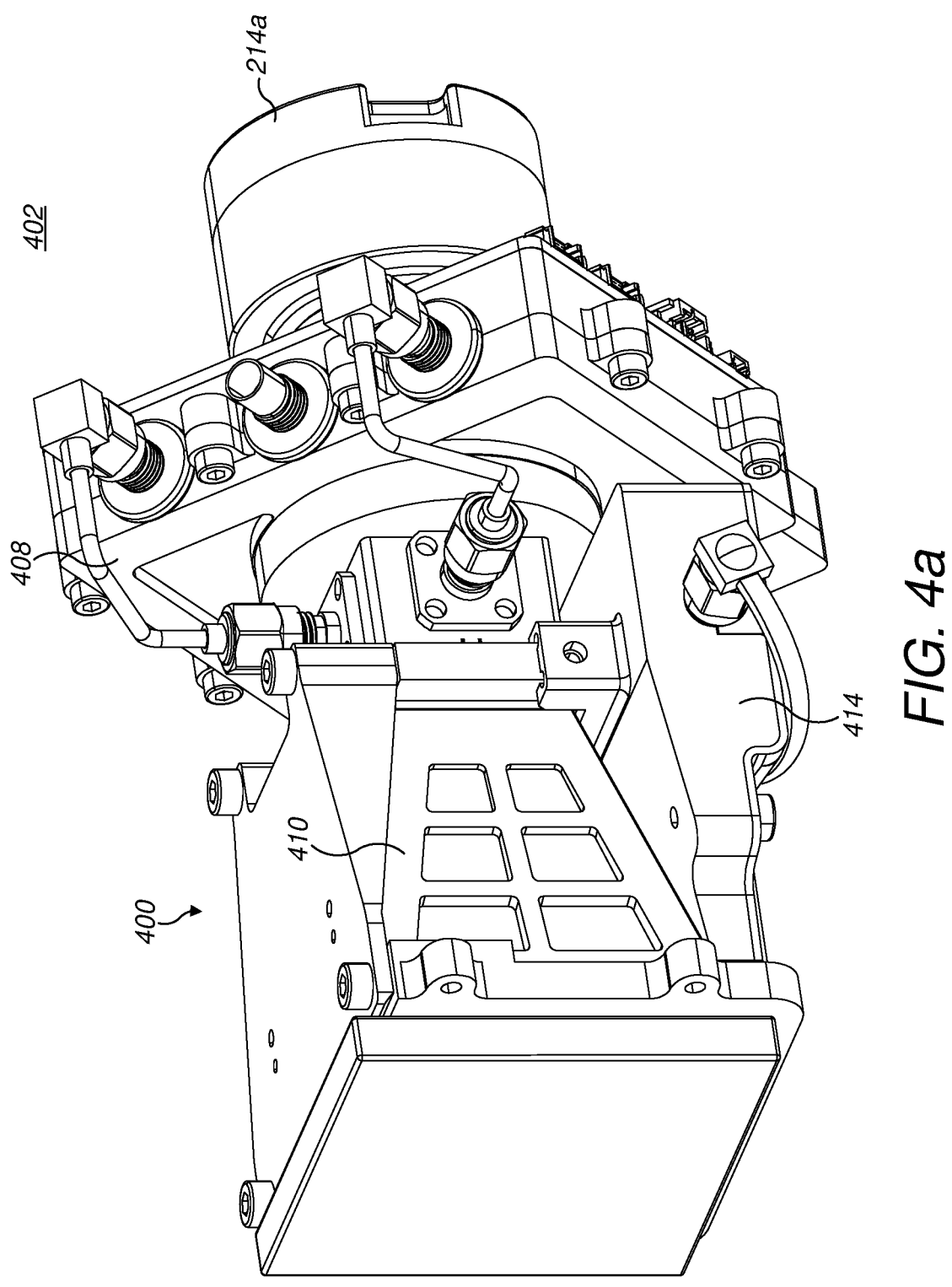
FIGS. 4a and 4b are schematic diagrams illustrating perspective views of an example payload for use with the gimbal stabilisation system according to some embodiments of the invention.
Figure 4B:
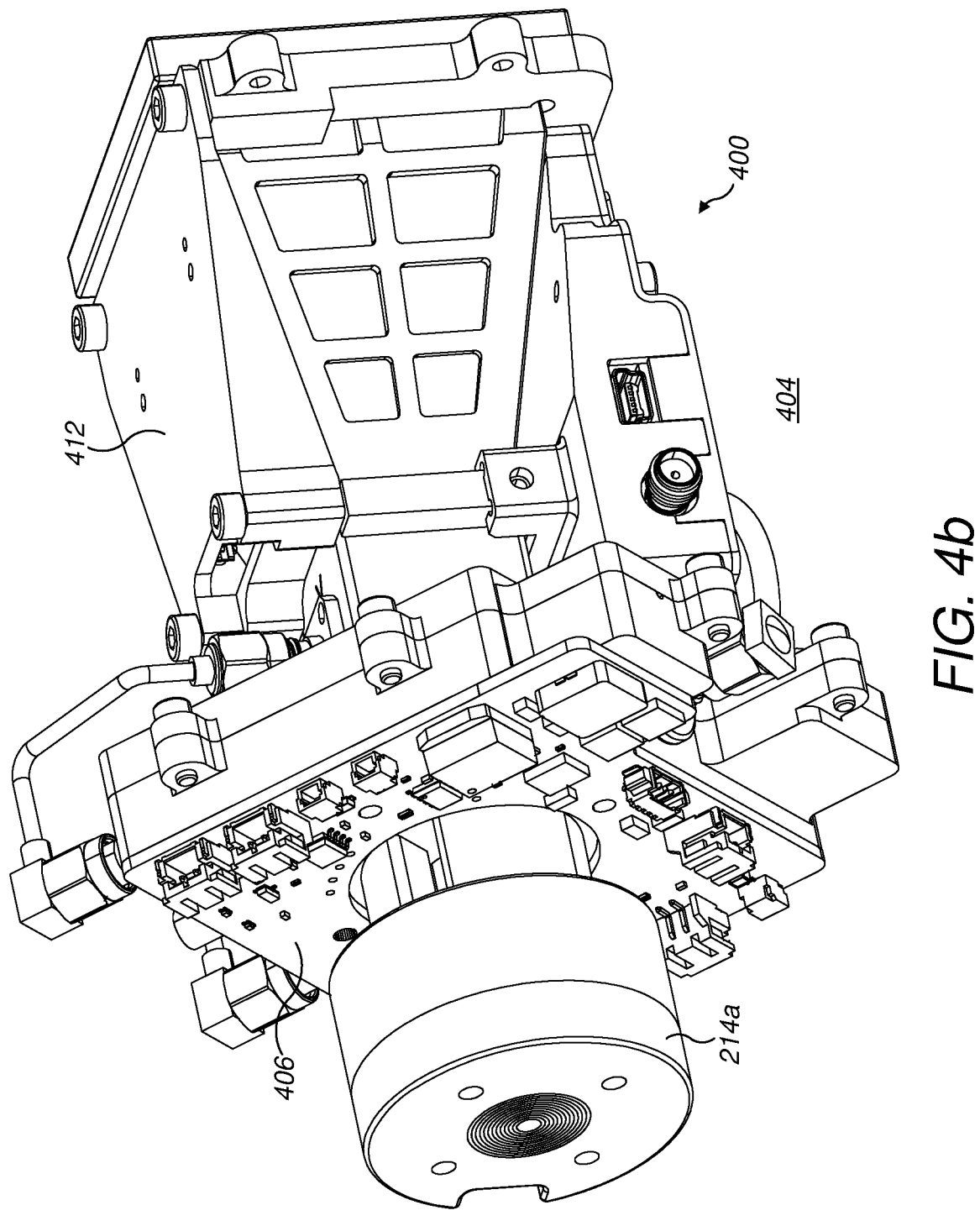

FIGS. 4a and 4b are schematic diagrams illustrating perspective views 402 and 404, respectively, of an example payload 400 for use with gimbal stabilisation systems 100, 200 and/or 300 as described with reference to FIGS. 1a to 3c, modifications thereof, combinations thereto, and/or as herein described according to some embodiments of the invention. In this example, the payload 400 is a pseudo-satellite assembly (or a directional horn and signal generator/receiver assembly) and is similar or the same as the example payload 208 of gimbal stabilisation system 200 as described with reference to FIGS. 2a to 2d. For simplicity, the reference numerals of FIGS. 2a to 2d may be reused for the same and/or similar components. In this example, the roll motor 214a of the roll motor assembly 214 is shown attached to the pseudo-satellite assembly 400. The roll motor 214a is attached to the roll motor assembly 214 of the pitch rotating ring 212c of the pitch rotating assembly 212 of the gimbal assembly 204b. Referring to FIGS. 4a and 4b, in this example, the pseudo-satellite assembly 400 includes a power and signal distribution PCB board 406 as viewed in FIG. 4b, an RF signal generator 408 (or frequency synthesizer) covered by a load bearing RF signal generator housing to which a dual polarized feedhorn 410 is also attached. In addition, there is a mounting arrangement 412 housing an inertial measurement unit (IMU) and another mounting arrangement 414 housing a GPSDO assembly. The pseudo-satellite assembly 400 may be configured to generate a Ku-band continuous wave (CW) test signal for APE procedures with AUT in which the UAV simulates a satellite.

Although a UAV-APE payload 400 as described here based on generating a Ku-band continuous wave (CW) test signal (e.g. type 1), this is by way of example only and the invention is not so limited, it is to be appreciated by the skilled person that there are many other variants of payload 400 that may use the same or similar principals such as, without limitation, for example one or more of: a UAV-APE type 1 payload that is configured to generate a Ku-band continuous wave test signal; a UAV-APE type 2 payload that is configured to generate Ka-band single frequency or modulated signal; a UAV-APE type 3 payload that is configured to combine linear polarization RF transmission from the feedhorn to produce a circular polarized signal; a UAV-APE type 4 payload that is configured to generate Ku-band single frequency or modulated signal; a UAV-APE type 5 payload that is configured as a combination of electronic and mechanical steered beam (phased array antenna); a UAV-APE type 6 payload that is configured for using an electronically steered beam (phased array antenna); any other type of payload with a communication interface and/or communication sensor interface including, without limitation, for example a transceiver, receiver, transmitter and other sensor/circuit and the like that may be configured for use in APE testing procedures using a UAV/aircraft in relation to testing any type antenna of an AUT; combinations thereof; modifications thereto; as herein described; and/or as the application demands.

Although the UAV-APE payload 400 has been described to be configurable and/or operable for using various types of Ku/Ka-band continuous wave test signals and the like in different types of APE tests, this is by way of example only and the invention is not so limited, it is to be appreciated by the skilled person in the art that UAV-APE payload 400 may be configured to include any type of communication interface/communication sensor interface is a transceiver, receiver, and/or transmitter and be controllable to generate, transmit and/or receive, without limitation, a communications signal, test signal, RF signal, continuous wave and the like and/or as the application demand in any desired one or more frequencies, and/or any desired one or more polarisations and the like. For example, the transceiver, receiver and/or transmitter of the payload 400 may be operable to perform, where relevant, at least one or more from the group of: generate and transmit a continuous wave or modulated test signal in a desired frequency; receive a continuous wave or modulated test signal in a desired frequency; generate and transmit a linearly polarised signal to the AUT; generate and transmit a circularly polarised signal to the AUT; receive a linearly polarised signal from the AUT; and receive a circularly polarised signal from the AUT; any other generation, transmission and/or reception of a signal or wave and the like based on/or as required by the type of APE used for testing the antenna of the AUT and/or as the application demands.

Figure 5:
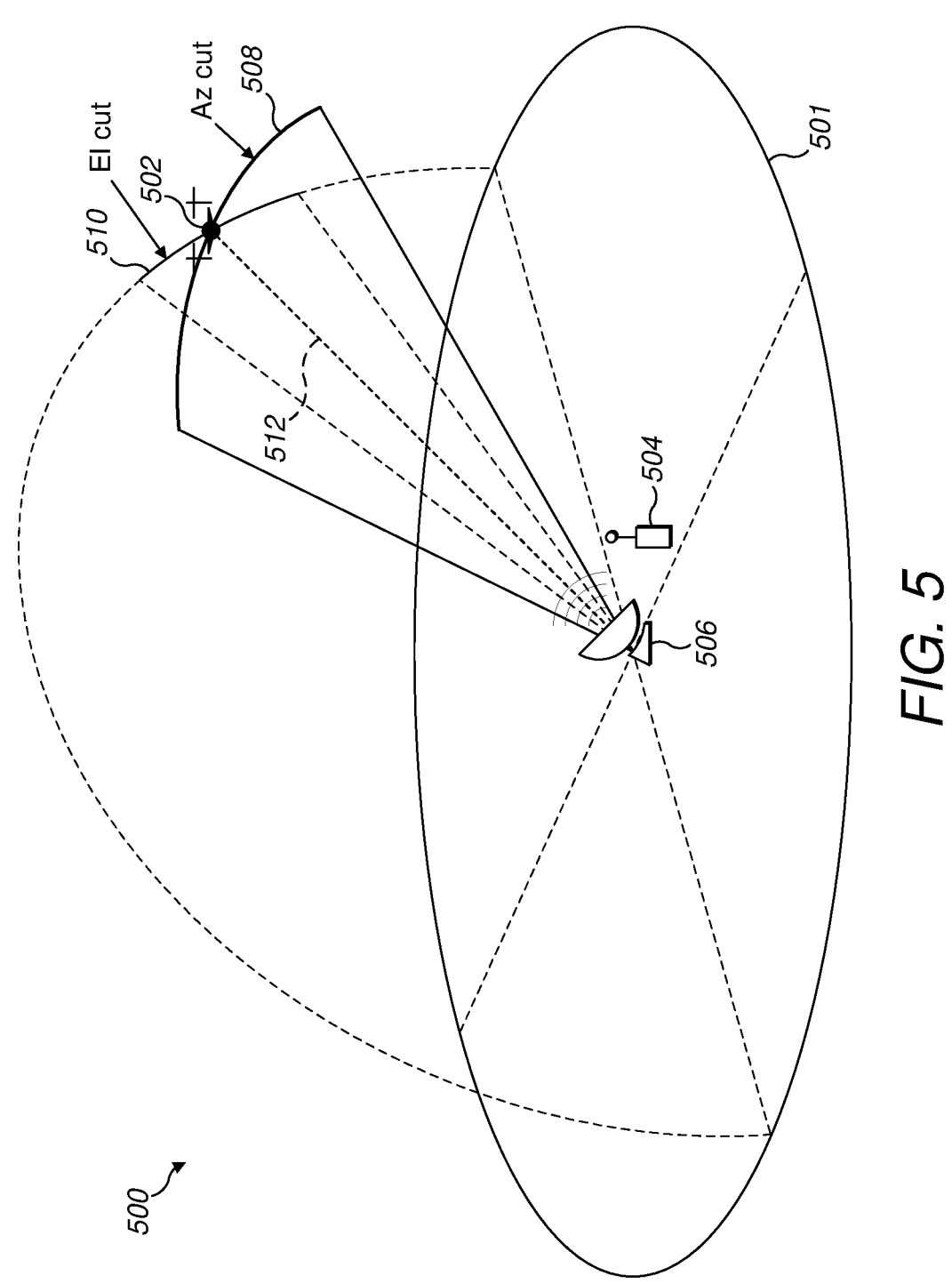
FIG. 5 is a schematic diagram illustrating an example test process for an AUT using the gimbal stabilisation system according to some embodiments of the invention.

FIG. 5 is a schematic diagram illustrating an example UAV test system 500 using a UAV 502 for an APE test procedure for an AUT 506, where the UAV 502 is configured to use a gimbal stabilisation system 100, 200, 300, as described with reference to FIGS. 1a to 4b, modifications thereof, combinations thereof, and/or as herein described according to some embodiments of the invention. In this example, the UAV test system 500 is configured to use a UAV 502 to perform an APE procedure in relation to AUT 506. Prior to the APE test procedure, the UAV test system 500 needs to be set up. A user of the UAV 502 (e.g. a technician, operator, APE test operator and the like) may arrive on the test site 501 on which the AUT 506 is located in which an antenna of the AUT 506 is to be tested. The user may bring a UAV (e.g. a drone) with the gimbal stabilisation system 100, 200, 300 and/or as described herein mounted thereon. The gimbal stabilisation system has a suitable payload configured for the test in the gimbal assembly. Other test equipment and a base station 504 may also be provided by the user. For example, the base station 504 may include a control station for receiving, without limitation, for example any RF measurements, flight data and the like from UAV 502 for real-time and/or subsequent analysis in relation to the APE procedure of the AUT 506. The base station 504 may also be configured to control the operation and flight path/route of the UAV 502 during an APE procedure with the AUT 506 and the like. The base station 504 may be a portable device.

The based station 504 may be a real-time kinematic (RTK) base station, which is the reference position for the UAV test system 500. As such, it will remain in the same location throughout the APE tests and may be used to compute the local positioning error. This also allows the UAV (e.g. drone) 502 to know where it is and assists the UAV 502 to perform an accurate automated flight in respect of the APE procedure when testing the AUT 506. The user may also measure the position of the antenna of the AUT 506 with reference to the RTK base station 504. This will then ensure that the antenna of the AUT 506 is at the centre of all measurement flight paths. The user may also identify and define the test environment 501 by choosing a safe take-off and landing spot for the UAV 502, as well as for deciding on the placement, if necessary, of the AUT 506 (if it is portable enough, or not already in-situ or installed in a vehicle and the like) and any other equipment required for the APE procedure. Once all the equipment is prepared, including a warm-up of test equipment, the AUT 506 can be prepared for the APE testing procedure. This may include, without limitation, for example identifying its position, ensuring proper functionality during the test, and placing the test receiving equipment on the AUT 506 and the like. As well, determination of accurate estimates for Azimuth (Az) and Elevation (El) for the APE test to provide a clear line of sight, i.e. avoiding the satellite arc, any tall buildings, antennas, trees, or other structures that may obstruct the antenna line of sight in relation to the UAV 502. The user may also check for any local interferences and calibrate/compensate the APE test procedure (e.g. the payload of the UAV 502) accordingly. The user can also start or bootstrap the alignment by roughly finding the Az and El of the antenna pointing of the AUT 506. Based on this rough alignment, the UAV 502 can be configured traverse a flight path that performs a raster scan measurement in which the correct Az and El angles of the AUT 506 are identified. Further verifications may be performed to ensure optimal accuracy.

Once the UAV test system 500 has been set-up and the UAV 502 can accurately determine the Az and El angles of the AUT 506, the UAV APE test may be performed. Thus, from the base station 504, the user may, in real-time, guide the UAV flight path to perform any desired measurements based on the APE test, whilst the gimbal stabilisation assembly automatically maintains/adjusts the pointing of the first section of the payload (e.g. feedhorn) of the UAV 502 in the direction of the AUT 506 and/or maintains/adjusts the alignment (e.g. polarisation alignment) of the first section of the payload (e.g. feedhorn) of the UAV 502 with that of the antenna of the AUT 506. Thus, during the APE test, the user does not need to adjust or continually compensate the position of the payload based on the flight path and/or attitude of the UAV 502 and the like. Instead, the user can concentrate on performing the APE test. For example, the user may plan numerous APE tests based on, without limitation, for example one or more of: an Azimuth cut 508, Elevation cut 510 or a Raster scan, as well as change the frequency and signal amplitude of the feedhorn of the payload in the gimbal assembly of the gimbal stabilisation system mounted on the UAV 502.

An APE test may be performed by manually and/or automatically performing real-time guidance of the flight path of the UAV 502 whilst in flight. The UAV 502 may be configured to take any desired measurement for performing the APE test in relation to the AUT 506 such as, without limitation, for example: performing an Azimuth cut 508, an Elevation cut 510, and/or Raster scan, and/or any other flight path or cut and the like, whilst varying frequencies and signal amplitudes of the feedhorn of the payload etc. Initially, the first test results returned from the UAV 502 may reveal how directive an antenna of the AUT 506 is and/or, in addition, provide enough information for displaying the shape of the radiation pattern of the AUT 506. The measurement of the actual antenna gain is achieved by using different methods determined by the final desired measurement accuracy. As another example APE test, a pattern cut may be performed in which a preprogramed test route, with the UAV 502 following a flight path that maintains a constant distance between the AUT 506 (based on the main beam 512 Az and El) and each RF data point measured and collected, and transmitted/stored for further processing by, without limitation, for example the base station 504 and the like. The UAV 502 and received signal status may be constantly monitored and the results generated can be graphically plotted for visual inspection or provided in data format.

Initially, for these test methods, the power recorder is relative, in dBm, and essentially the first set of results may reveal how directive an antenna of an AUT 506 is and the shape of the radiation pattern. Further test methods may be required to, without limitation, for example perform one or more of: measure the actual antenna gain; apply the correct mask, where one can either use a known gain antenna; or calculate the gain using the 3 dB beam width rule; and/or carefully calculate the link budget of the system; and/or any other type of test and the like as the application demands. The chosen test method is dependent on the final desired measurement accuracy. Another type of test method, such as a pattern cut may be performed by the UAV over a preprogrammed test route. For example, the route may be built/designed as a semi-circular line in front of the AUT 506 (based on the main beam 512 Az and El) and with all points at an equal distance towards the AUT 506. The flight speed of the UAV 502 may be determined by a factor of distance from AUT 506 and the number of desired collected data points for analysis. During the flight, the status of the UAV 502 and received signal are monitored from the base station 504 (e.g. ground control station). The system may record the UAV GNSS position. The receive measurement equipment can record in the peak power level (PPL) mode. The results are generated by combining the information regarding the antenna pointing and position with the UAV 502 position and the recorded power level. The results can either be graphically plotted for visual inspection or provided in data format for use in other third-party software.

Using a UAV 502 to perform APE test procedures in relation to an AUT 506 may provide many advantages such as, for example, UAV 502 flexibility and manoeuvrability; simulating motion in relation to the AUT 506; selecting the environment as well as the direction and elevation of the antenna; UAV 502 allows the measurement to be done in a wider range of far field distances, ranging from few dozens of meters to kilometres; and/or portability. Furthermore, using UAV(s) with the gimbal stabilisation system as described with reference to FIGS. 1*a* to 6*b* for performing antenna performance evaluation (APE) procedures provides the advantage of enabling an accurate, cost effective and portable method of testing the performance of an AUT in situ, at a test site, and/or at a test site prior to installation and the like. The weight of the gimbal stabilisation system with payload for performing APE's on AUTs is within the UAV payload capability range. Thus, UAVs are more cost effective than manned aircraft, and the size of UAVs means they are easily transportable to any location where the AUT may be tested.

Figure 6A:
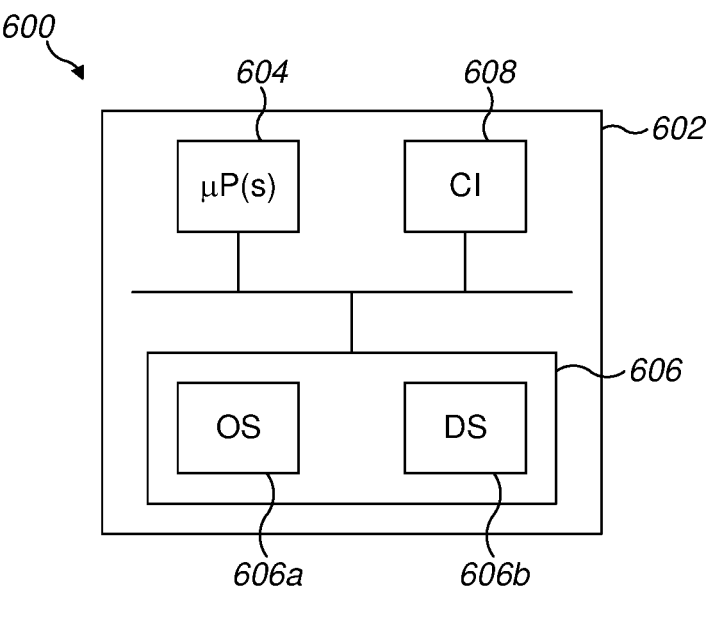
FIG. 6a is a schematic diagram illustrating an example computing system, device or apparatus according to some embodiments of the invention.

FIG. 6*a* is a schematic diagram illustrating an example computing system 600 that comprises at least one computing device 602 that may be used to implement one or more aspects of the gimbal stabilisation system, UAV, aircraft, controller and/or any other aspects according to the invention and/or includes the methods/process(es)/system(s) and apparatus as described with reference to FIGS. 1*a*-5. Computing device 602 includes one or more processor unit(s) 604, memory unit 606 and communication interface 608 in which the one or more processor unit(s) 604 are connected to the memory unit 606 and the communication interface 608. The communications interface 608 may connect the computing device 602 to one or more other device(s), command and control unit(s), one or more sensor(s), RF station(s), external or cloud storage or processing system(s) and the like. The memory unit 606 may store one or more program instructions, code or components such as, by way of example only but not limited to, an operating system 606*a* for operating computing device 602 and a data store 606*b* for storing additional data and/or further program instructions, code and/or components associated with implementing the functionality and/or one or more function(s) or functionality associated with the gimbal stabilisation system and/or functionality of one or more of the controller assembly, gimbal assembly, controller, yaw, pitch and/or roll motors, flight control system(s) and/or payload, method(s), process(es), any other functionality of the aircraft/UAV, APE procedures as described with reference to FIGS. 1*a*-5, combinations thereof, modifications thereof and/or as described herein and the like according to the invention.

The memory unit may include a computer-readable medium with data or instruction code, which when executed on the processor unit, causes the processor unit to implement the functionality of the controller, control assembly, gimbal assembly and/or gimbal stabilisation system, process(es)/method(s) as described herein and/or modifications thereof. The apparatus or computing device may be further configured to implement the functionality of the gimbal stabilisation system, UAV/aircraft, a user interface and/or the sensor suite/payload or interface with the sensor suite/payload as described herein and/or modifications thereof.

Figure 6B:
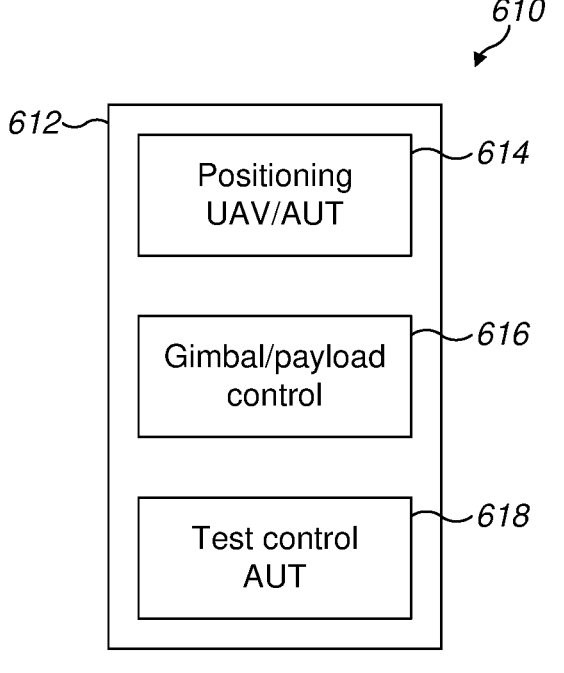
FIG. 6b is a schematic diagram illustrating an example UAV-APE system according to some embodiments of the invention.

FIG. 6*b* is a schematic diagram illustrating an example UAV-APE system 610 with a gimbal stabilisation system 612 according to some embodiments of the invention. The gimbal stabilisation system 612 for an aircraft/UAV including a control assembly rotatably coupled to a gimbal assembly including a payload, the control assembly including a controller configured for receiving positioning information associated with the UAV and/or an AUT during an APE from positioning UAV/AUT module(s) 614, the controller further including gimbal/payload control module/component 616 configured to operate the control assembly/gimbal assembly and/or yaw, pitch and/or roll motor(s) of the gimbal stabilisation system based on the positioning information and to adjust/maintain pointing and/or alignment of a first section of the payload in the direction or towards an AUT, where a second section of the payload is rotatably coupled to the gimbal assembly of the gimbal stabilisation system 612. The UAV/controller may be further configured to include a test/control AUT module 618 configured to operate the payload and/or perform an APE procedure in relation to the AUT. The first section of payload includes a communication interface/communication sensor interface for use in testing the AUT during the APE procedure and the like. The gimbal stabilisation system 612 include the functionality, process(es), method(s), apparatus, control assembly, gimbal assembly, payload, and other sensors/communication sensors and the like as described with reference to FIGS. 1*a* to 6*b*, combinations thereof, modifications thereto, and/or as described herein, and/or as the application demands.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform or implement the functionality of the gimbal stabilisation system controller/control assembly, gimbal assembly, flight control system(s), yaw, pitch and/or roll motors/control, method(s), process(es), any other functionality of the gimbal stabilisation system, payload and/or UAV/aircraft as described with reference to FIGS. 1*a* to 6*b*, combinations thereof, modifications thereof and/or as described herein.

In the embodiment(s) and example(s) described above the flight control system and/or the operations control centre may include computing device(s) and/or one or more server(s), which may comprise a single server or a network of servers. In some examples the functionality or parts of the functionality of the computing device and/or server may be provided by a network of servers distributed across a geographical area, such as a worldwide distributed network of servers, and a user may be connected to an appropriate one of the network of servers based upon a user location.

There may be provided a computer-readable medium including data or instruction code, which when executed on one or more processor(s), causes the one or more processor(s) to implement the functionality and/or one or more function(s) or functionality associated with the gimbal stabilisation system, control assembly, gimbal assembly, yaw, pitch and/or roll motors, method(s), process(es), any other functionality of the UAV/aircraft, payload, operations centre/command and control stations, as described with reference to FIGS. 1*a* to 6*b*, combinations thereof, modifications thereof and/or as described herein and the like according to the invention.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method of controlling a gimbal stabilisation system of an aircraft in an antenna test system for testing an antenna under test, AUT, the gimbal stabilisation system comprising a control assembly rotatably coupled to a gimbal assembly comprising a payload, the payload comprising a first section including a communication sensor interface for use in testing the AUT and a second section rotatably coupled to the gimbal assembly, the control assembly comprising a controller, the method, performed by the controller, further comprising:

receiving an in-flight position of the aircraft during testing of the AUT;

receiving a position of the AUT in relation to the aircraft; and controlling the gimbal assembly by:

calculating a pointing direction and alignment of the first section of the payload relative to the AUT based on the received position of the aircraft and the received position of the AUT; and maintaining pointing and alignment of the first section of the payload towards the AUT based on the calculated pointing direction and alignment of the first section of the payload, wherein maintaining pointing and alignment of the first section of the payload towards the AUT comprises controlling the pointing and the alignment of the payload about at least three axes of rotation, wherein one axis of rotation of said at least three axes of rotation is configured to control said alignment of the payload.

2. The computer-implemented method of claim 1, wherein receiving the in-flight position of the aircraft further comprising receiving data representative of global positioning system, GPS, position, heading, altitude and/or attitude of the aircraft.

3. The computer-implemented method of claim 1, further comprising receiving the position of the AUT further comprising receiving data representative of information associated with the position of the AUT.

4. The computer-implemented method of claim 1, wherein the communication sensor interface further comprises at least one from the group of:

a receiver;

a transmitter;

a transceiver;

and/or any other communication interface and/or communication sensor interface configured for testing the AUT.

5. The computer-implemented method of claim 1, wherein the control assembly is rotatably coupled to the gimbal assembly by a first motor, the gimbal assembly further comprising:

a first rotating arm coupled to the first motor, the first motor configured to rotate the first rotating arm around a first axis of rotation, the first rotating arm coupled to a second motor at an end of the first rotating arm distal to the coupling of the first rotating arm to the first motor;

a second rotating arm coupled to the second motor, the second motor configured to rotate the second rotating arm around a second axis of rotation, the second axis of rotation orthogonal to the first axis of rotation, the second rotating arm coupled to a third motor, wherein the third motor is configured to rotate the payload coupled to the third motor at the second section of the payload about a third axis of rotation, wherein the third axis of rotation is different to the second axis of rotation; and the controller of the control assembly electrically connected to the first motor, the second motor and third motor;

wherein controlling the gimbal assembly further comprising:

maintaining pointing and alignment of the first section of the payload further comprising controlling one or more of the first motor, second motor, and third motors based on the calculated pointing direction and alignment of the first section of the payload towards the AUT.

6. The computer-implemented method of claim 5, wherein the first axis of rotation is a yaw axis of rotation in relation to the gimbal assembly, the second axis of rotation is a pitch axis of rotation in relation to the gimbal assembly, and the third axis of rotation is a roll axis of rotation in relation to the gimbal assembly.

7. The computer-implemented method of claim 5, wherein the first, second and third motors each comprise at least one from the group of: a gimbal motor; a brushless motor; a brushless gimbal motor; a gimbal drive motor; and/or any suitable motor for use in adjusting and/or maintaining the pointing direction and/or alignment of the first section of payload in the direction of the AUT.

8. The computer-implemented method of claim 5, wherein the first, second and third motors corresponding to a yaw motor, pitch motor and roll motor, respectively.

9. The computer-implemented method of claim 5, wherein controlling the gimbal assembly further comprising:

calculating the theoretical angles for yaw, pitch and roll of the payload in relation to the AUT;

calculating drift offsets of the gimbal assembly based on comparing feedback from data representative of current received position of the aircraft and with attitude and heading reference system of the aircraft for correcting drift in the gimbal assembly; and sending angle commands and drift offsets to a gimbal controller for controlling one or more of the first motor, second motor, and third motors based on combining drift offsets with theoretical angles for yaw, pitch and roll.

10. The computer-implemented method of claim 5, wherein controlling the gimbal assembly further comprising:

when using the payload for testing linear polarized systems, controlling the gimbal assembly to maintain polarisation alignment of the payload communication sensor interface polarisation with the AUT polarisation by:

comparing the received in-flight position of the aircraft with the received position of the AUT;

calculating a theoretical roll adjustment value for at least adjusting the roll angle of the payload in relation to the AUT based on the comparison for maintaining polarisation alignment; and sending a roll angle command to the roll motor of gimbal assembly.

11. The computer-implemented method of claim 1, wherein a base station is located at a geographic position relative to the AUT, the location of the base station defining a reference position for the aircraft during testing of the AUT, and receiving the position of the AUT further comprises:

receiving the position of the base station;

calculating the position of the AUT based on the geographic position of the AUT relative to the position of the base station.

12. The computer-implemented method of claim 1, wherein the payload further comprises a camera located at the first end of the payload, and receiving the position of the AUT further comprising:

analysing one or more image(s) from the camera to identify a position of the AUT;

and calculating the position of the AUT based on the identified position of the AUT in said one or more analysed images.

13. The computer-implemented method of claim 12, wherein:

analysing one or more image(s) from the camera to identify a position of the AUT further comprises analysing one or more image(s) from the camera to identify the AUT; and calculating the position of the AUT based on the position of the identified AUT in said one or more analysed images.

14. The computer-implemented method of claim 12, wherein a base station is located at a geographic position relative to the AUT, the location of the base station defining a reference position for the aircraft during testing of the AUT, and receiving the position of the AUT further comprises:

receiving the position of the base station;

calculating the position of the AUT based on the geographic position of the AUT relative to the position of the base station; and wherein:

analysing one or more image(s) from the camera to identify a position of the AUT further comprises analysing one or more image(s) from the camera to identify the base station; and calculating the position of the AUT based on the position of the identified base station in said one or more analysed images and based on the geographic position of the AUT relative to the position of the identified base station.

15. The computer-implemented method of claim 1, wherein the AUT includes a beacon signal and receiving the position of the AUT further comprising:

receiving the beacon signal associated with the AUT; and determining the position of the AUT based on the received beacon signal.

16. The computer-implemented method of claim 12, wherein a base station is located at a geographic position relative to the AUT, the location of the base station defining a reference position for the aircraft during testing of the AUT, and receiving the position of the AUT further comprises:

receiving the position of the base station;

calculating the position of the AUT based on the geographic position of the AUT relative to the position of the base station; and wherein the base station includes a beacon signal and receiving the position of the AUT further comprises:

receiving the beacon signal associated with the based station; and determining the position of the AUT based on the received beacon signal from the base station and the geographic position of the AUT relative to the position of the base station.

17. The computer-implemented method of claim 1, further comprising maintaining pointing of the first section of the payload towards a designated position in relation to the AUT.

18. The computer-implemented method of claim 1, wherein the aircraft is an unmanned aerial vehicle.

19. A non-transitory computer-readable medium comprising computer code or instructions stored thereon, which when executed on a processor, causes the processor to perform the computer implemented method according to claim 1.

20. A gimbal stabilisation system for an aircraft comprising a control assembly rotatably coupled to a gimbal assembly comprising a payload, the control assembly comprising a controller configured to operate the gimbal assembly to maintain pointing of a first section of the payload towards an antenna under test, AUT, with a second section of the payload rotatably coupled to the gimbal assembly, wherein the first section comprises a communication sensor interface for use in testing the AUT, the gimbal assembly further comprising operating the controller of the gimbal stabilisation system based on a computer-implemented method of controlling a gimbal stabilisation system of an aircraft in an antenna test system for testing an antenna under test, AUT, the gimbal stabilisation system comprising a control assembly rotatably coupled to a gimbal assembly comprising a payload, the payload comprising a first section including a communication sensor interface for use in testing the AUT and a second section rotatably coupled to the gimbal assembly, the control assembly comprising a controller, the method, performed by the controller, further comprising:

receiving an in-flight position of the aircraft during testing of the AUT;

receiving a position of the AUT in relation to the aircraft; and controlling the gimbal assembly by:

calculating a pointing direction and alignment of the first section of the payload relative to the AUT based on the received position of the aircraft and the received position of the AUT; and maintaining pointing and alignment of the first section of the payload towards the AUT based on the calculated pointing direction and alignment of the first section of the payload;

wherein maintaining pointing and alignment of the first section of the payload towards the AUT comprises controlling the pointing and the alignment of the payload about at least three axes of rotation, wherein one axis of rotation of said at least three axes of rotation is configured to control said alignment of the payload.

21. An apparatus comprising a processor unit, a memory unit, and a communication interface, the processor unit connected to the memory unit and the communication interface, wherein the processor unit, memory unit and communication interface are adapted to implement a computer-implemented method of controlling a gimbal stabilisation system of an aircraft in an antenna test system for testing an antenna under test, AUT, the gimbal stabilisation system comprising a control assembly rotatably coupled to a gimbal assembly comprising a payload, the payload comprising a first section including a communication sensor interface for use in testing the AUT and a second section rotatably coupled to the gimbal assembly, the control assembly comprising a controller, the method, performed by the controller, further comprising:

receiving an in-flight position of the aircraft during testing of the AUT;

receiving a position of the AUT in relation to the aircraft; and controlling the gimbal assembly by:

calculating a pointing direction and alignment of the first section of the payload relative to the AUT based on the received position of the aircraft and the received position of the AUT; and maintaining pointing and alignment of the first section of the payload towards the AUT based on the calculated pointing direction and alignment of the first section of the payload, wherein maintaining pointing and alignment of the first section of the payload towards the AUT comprises controlling the pointing and the alignment of the payload about at least three axes of rotation, wherein one axis of rotation of said at least three axes of rotation is configured to control said alignment of the payload.

22. A system comprising:

an aircraft comprising a gimbal stabilisation apparatus according to claim 21; and an AUT, wherein the aircraft is configured to perform testing of the AUT using the gimbal stabilisation apparatus.

* * * * *